(12) United States Patent
Lee et al.

(10) Patent No.: US 11,716,246 B2
(45) Date of Patent: Aug. 1, 2023

(54) DEVICE AND METHOD FOR PROVIDING EDGE COMPUTING SERVICE IN WIRELESS COMMUNICATION SYSTEM

(71) Applicant: Samsung Electronics Co., Ltd., Gyeonggi-do (KR)

(72) Inventors: Jicheol Lee, Gyeonggi-do (KR); Sunghoon Kim, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 17/599,360

(22) PCT Filed: Mar. 27, 2020

(86) PCT No.: PCT/KR2020/004167
§ 371 (c)(1),
(2) Date: Sep. 28, 2021

(87) PCT Pub. No.: WO2020/204474
PCT Pub. Date: Oct. 8, 2020

(65) Prior Publication Data
US 2022/0191090 A1  Jun. 16, 2022

Related U.S. Application Data

(60) Provisional application No. 62/867,424, filed on Jun. 27, 2019, provisional application No. 62/846,213, (Continued)

(51) Int. Cl.
*G06F 15/16* (2006.01)
*H04L 41/0806* (2022.01)
*H04L 67/146* (2022.01)

(52) U.S. Cl.
CPC ........ *H04L 41/0806* (2013.01); *H04L 67/146* (2013.01)

(58) Field of Classification Search
CPC .......................... H04L 41/0806; H04L 67/146
(Continued)

(56) References Cited

U.S. PATENT DOCUMENTS 7,426,546 B2 * 9/2008 Breiter .................... H04L 65/80
709/219
8,412,791 B2 * 4/2013 Agarwalla .............. H04L 67/34
709/201
(Continued)

FOREIGN PATENT DOCUMENTS

KR  10-2004-0013966  2/2004
KR  10-2007-0052492  5/2007
(Continued)

OTHER PUBLICATIONS

PCT/ISA/210 Search Report issued on PCT/KR2020/004257, dated Jul. 30, 2020, pp. 7.
(Continued)

*Primary Examiner* — Moustafa M Meky
(74) *Attorney, Agent, or Firm* — The Farrell Law Firm, P.C.

(57) ABSTRACT

The present disclosure relates to a communication technique which combines a 5G communication system, for supporting a higher data transmission rate than 4G systems, with IoT technology, and a system for same. The present disclosure relates to a wireless communication system, and more specifically, the present disclosure relates to: an application layer network structure which provides an edge computing service in a cellular wireless communication system (5G system); and a method for same. A method according to an embodiment of the present disclosure is a method for a terminal to acquire edge data network setting information in order to receive an edge computing service in a wireless communication system, and includes: a step for transmitting an initial provisioning request message to an edge data
(Continued)

network configuration server; and a step for receiving, from the edge data network configuration server, an initial provisioning response message including information about an edge data network, wherein the initial provisioning request message may include a URI address of the edge data network configuration server.

15 Claims, 19 Drawing Sheets

Related U.S. Application Data filed on May 10, 2019, provisional application No. 62/826,250, filed on Mar. 29, 2019.

(58) Field of Classification Search
USPC .......................................................... 709/222
See application file for complete search history.

(56) References Cited

U.S. PATENT DOCUMENTS

| | | | |
|---|---|---|---|
| 9,781,215 B2* | 10/2017 | Calo | H04L 69/18 |
| 9,917,908 B1* | 3/2018 | Knecht | H04L 63/145 |
| 9,942,577 B1* | 4/2018 | Burford | H04L 65/612 |
| 10,601,946 B2* | 3/2020 | Arsenault | H04L 65/762 |
| 10,667,172 B2* | 5/2020 | Ingerman | H04W 28/0284 |
| 10,798,006 B2* | 10/2020 | Bohra | H04L 41/147 |
| 10,812,526 B2* | 10/2020 | Apelewicz | H04L 9/0861 |
| 11,012,362 B2* | 5/2021 | Ingerman | G06F 8/65 |
| 11,025,740 B2* | 6/2021 | Arsenault | H04L 67/02 |
| 11,290,383 B2* | 3/2022 | Bohra | H04L 47/28 |
| 11,336,648 B2* | 5/2022 | Eisner | G06F 16/178 |
| 11,553,217 B2* | 1/2023 | Jayawardene | H04N 21/44004 |
| 2007/0130156 A1 | 6/2007 | U. Tenhunen et al. | |
| 2007/0226617 A1* | 9/2007 | Traub | H04L 67/75 340/572.1 |
| 2011/0167270 A1 | 7/2011 | Lee et al. | |
| 2013/0254258 A1* | 9/2013 | Agarwalla | H04L 9/40 709/202 |
| 2015/0012593 A1* | 1/2015 | Phillips | H04L 67/5681 709/204 |
| 2015/0381756 A1* | 12/2015 | Lotfallah | H04L 67/568 709/213 |
| 2017/0026233 A1 | 1/2017 | Boutros et al. | |
| 2017/0109797 A1* | 4/2017 | Boffa | H04L 67/146 |
| 2017/0201585 A1 | 7/2017 | Doraiswamy et al. | |
| 2017/0251368 A1 | 8/2017 | Ross et al. | |
| 2017/0303259 A1 | 10/2017 | Lee et al. | |
| 2017/0339118 A1 | 11/2017 | Hwang et al. | |
| 2018/0167434 A1* | 6/2018 | Sathyanarayana | H04L 67/146 |
| 2018/0241836 A1* | 8/2018 | Arsenault | H04L 67/5681 |
| 2018/0249317 A1 | 8/2018 | Kurasugi et al. | |
| 2019/0182788 A1 | 6/2019 | Lee et al. | |
| 2019/0313358 A1 | 10/2019 | Lee et al. | |
| 2019/0379756 A1* | 12/2019 | Postelnik | H04L 67/04 |
| 2019/0386923 A1* | 12/2019 | Ingerman | H04W 28/0289 |
| 2020/0120032 A1* | 4/2020 | Bohra | H04L 47/127 |
| 2020/0220944 A1* | 7/2020 | Arsenault | H04L 65/762 |
| 2021/0051103 A1* | 2/2021 | Bohra | H04L 49/503 |

FOREIGN PATENT DOCUMENTS

| | | |
|---|---|---|
| KR | 10-2009-0039451 | 4/2009 |
| KR | 10-2017-0119296 | 10/2017 |
| KR | 10-2017-0129549 | 11/2017 |
| KR | 10-2018-0021636 | 3/2018 |
| KR | 10-2018-0119162 | 11/2018 |
| KR | 10-2020-0130365 | 11/2020 |
| WO | WO 2011/081242 | 7/2011 |
| WO | WO 2018/038490 | 3/2018 |

OTHER PUBLICATIONS

PCT/ISA/237 Written Opinion issued on PCT/KR2020/004257, dated Jul. 30, 2020, pp. 5.
Reinke, Johann, "Bubble Code", http://www.bubblecode.net/en/2016/01/22/understanding-oauth2/, Jan. 22, 2016, pp. 22.
3GPP TSG SA WG6#30, S6-190533, Apr. 8-12, 2019, Newport Beach, California, USA, pp. 36.
3GPP; TSG SA; System Architecture for the 5G System; Stage 2 (Release 16), 3GPP TS 23.501 V16.0.0, Mar. 28, 2019, pp. 320.
PCT/ISA/210 Search Report issued on PCT/KR2020/004167, dated Jul. 2, 2020, pp. 5.
PCT/ISA/237 Written Opinion issued on PCT/KR2020/004167, dated Jul. 2, 2020, pp. 5.
3GPP, 3rd Generation Partnership Project; Technical Specification Group Services and System Aspects; System Architecture for the 5G System; Stage 2, (Release 16), 3GPP TS 23.501 Draft V16.0.0+, Feb. 2019, 281 pages.
Nishant Gupta, "Study on Application Architecture for Enabling EDGE Applications", S6-190111, 3GPP TSG-SA WG6 Meeting #28, Jan. 21-25, 2019, 8 pages.
3GPP, 3rd Generation Partnership Project; Technical Specification Group Services and System Aspects; Study on Application Architecture for Enabling Edge Applications; (Release 17), 3GPP TR 23.758 V0.2.0, May 2019, 30 pages.
Samsung, "Solution 2 update and Evaluation", S6-191339, 3GPP TSG-SA WG6 Meeting #32, Jul. 8-12, 2019, 5 pages.
Samsung Electronics, "A New Solution for Flexible Deployment", S6-191223, S6-191150, S6-190967, 3GPP TSG-SA WG6 Meeting #31, May 20-24, 2019, 6 pages.
CATT, "Pseudo-CR on Solution of Initial Provisioning with Authorization", S6-192153, 3GPP TSG-SA WG6 Meeting #34, Nov. 11-15, 2019, 6 pages.
3GPP, 3rd Generation Partnership Project; Technical Specification Group Services and System Aspects; Architecture for Enabling Edge Applications; (Release 17), 3GPP TS 23.558, V0.1.2, Jan. 2020, 40 pages.
European Search Report dated Mar. 3, 2022 issued in counterpart application No. 20784236.0-1216, 12 pages.

* cited by examiner

DEVICE AND METHOD FOR PROVIDING EDGE COMPUTING SERVICE IN WIRELESS COMMUNICATION SYSTEM

PRIORITY

This application is a National Phase Entry of PCT International Application No. PCT/KR2020/004167, which was filed on Mar. 27, 2020, and claims priority to U.S. Provisional Patent Application Nos. 62/826,250, 62/846,213 and 62/867,424, which were filed on Mar. 29, 2019, May 10, 2019 and Jun. 27, 2019, respectively, the content of each of which is incorporated herein by reference.

TECHNICAL FIELD

The disclosure relates to a device and a method for providing an edge computing service and, more particularly, to a device and a method for providing an edge computing service in a wireless communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System".

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure". "service interface technology", and "security technology" have been demanded for IoT implementation, a sensor network, a machine-to-machine (M2M) communication, machine type communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

The 3GPP, which is in charge of cellular mobile communication standards, has named a new core network structure 5G core (5GC) and is standardizing the 5GC in order to evolve from an existing 4G LTE system to a 5G system.

The 5GC can support the following differentiated functions compared to the evolved packet core (EPC), which is the existing 4G network core.

First, a network slice function is introduced in the 5GC. According to a 5G requirement, the 5GC needs to support various types of terminals and services, for example, enhanced mobile broadband (eMBB), ultra-reliable low-latency communications (URLLC), and massive machine-type communications (mMTC).

Each terminal/service has different requirements in a core network. For example, an eMBB service may require a high data rate, while an URLLC service may require high stability and low latency. To satisfy various service requirements, network slicing is proposed.

Network slicing is a method of producing a plurality of logical networks by virtualization of one physical network, and each network slice instance (NSI) may have a different characteristic. Thus, each NSI may have a network function (NF) suitable for the characteristic thereof, thereby satisfying various service requirements. Accordingly, an NSI suitable for the characteristic of a required service may be allocated to each terminal, thereby efficiently supporting various 5G services.

Second, the 5GC can easily support a network virtualization paradigm by separating a mobility management function and a session management function. In existing 4G LTE, all terminals can receive services from a network through signaling exchange with a single core device called a mobility management entity (MME) that is in charge of registration, authentication, mobility management, and session management functions.

However, in 5G, as the number of terminals is explosively increasing and mobility and traffic/session characteristics to be supported are segmented according to the types of terminals, when a single device, such as an MMF, supports all functions, scalability to add an entity for each required function is bound to decrease. Accordingly, various functions are being developed based on a structure in which a mobility management function and a session management function are separated in order to address complexity in function/implementation of a core device in charge of a control plane and to improve scalability in signaling load.

DISCLOSURE OF INVENTION

Technical Problem

In the disclosure, it may be needed to support a flexible edge computing network architecture for supporting scenarios in which an edge computing platform of a local area data network of an operator is operated and installed in various forms within the operator.

A user equipment (UE) registered in one operator network may need to be able to connect to a plurality of edge computing platforms provided by a plurality of edge computing platform service providers to receive a service.

A UE registered in one operator network may need to be able to distinguish an area where an edge computing platform is provided from an area where an edge computing platform is not provided and to discover the address of an edge computing server to be accessed by an application layer in the area where the edge computing platform is provided.

Solution to Problem

A method according to an embodiment of the disclosure is a method for obtaining edge data network configuration information by a user equipment (UE) to receive an edge computing service in a wireless communication system, the method including: transmitting an initial provisioning request message to an edge data network configuration server; and receiving an initial provisioning response message including information about an edge data network from the edge data network configuration server, wherein the initial provisioning request message may include a URI address of the edge data network configuration server.

A method according to another embodiment of the disclosure is a method for providing edge data network configuration information by the edge data network configuration server to a UE through a wireless communication system, the method including: receiving an initial provisioning request message from the UE; and receiving an initial provisioning response message including information about an edge data network, wherein the initial provisioning request message may include a URI address of the edge data network configuration server.

A device according to an embodiment of the disclosure is a user device for obtaining edge data network configuration information to receive an edge computing service in a wireless communication system, the user device including: an application client configured to be provided with an edge computing service and to provide the edge computing service to a user; an edge enabler client configured to perform control for accessing an edge computing server to provide the edge computing service; and a mobile terminal configured to perform a modem operation for accessing the wireless communication system, wherein the edge enabler client may control the mobile terminal to transmit an initial provisioning request message to an edge data network configuration server, and may control the mobile terminal to receive an initial provisioning response message including information about an edge data network from the edge data network configuration server, and wherein the initial provisioning request message may include a URI address of the edge data network configuration server.

Advantageous Effects of Invention

According to the disclosure, a plurality of edge computing network operators can provide edge computing services in one operator network. Further, according to the disclosure, it is possible to operate an edge computing platform for each area.

MODE FOR INVENTION

Hereinafter, embodiments of the disclosure will be described in detail with reference to the accompanying drawings. In the following description of the disclosure, a detailed description of known functions or configurations incorporated herein will be omitted when it may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In the following description, a base station is an entity that allocates resources to terminals, and may be at least one of a gNode B, an eNode B, a Node B, a base station (BS), a wireless access unit, a base station controller, and a node on a network A terminal may include a user equipment (UE), a mobile station (MS), a cellular phone, a smartphone, a computer, or a multimedia system capable of performing communication functions. In the disclosure, a downlink (DL) may refer to a radio transmission path via which a base station transmits a signal to the terminal, and an uplink (UL) may refer to a radio transmission path via which a terminal transmits a signal to a base station.

In the following description of embodiments of the disclosure, the LTE or LTE-A system will be described by way of example, but the embodiments of the disclosure may be applied to other communication systems having similar backgrounds or channel types. In addition, based on determinations by those skilled in the art, the embodiments of the disclosure may be applied to other communication systems through some modifications without significantly departing from the scope of the disclosure.

Figure 1:
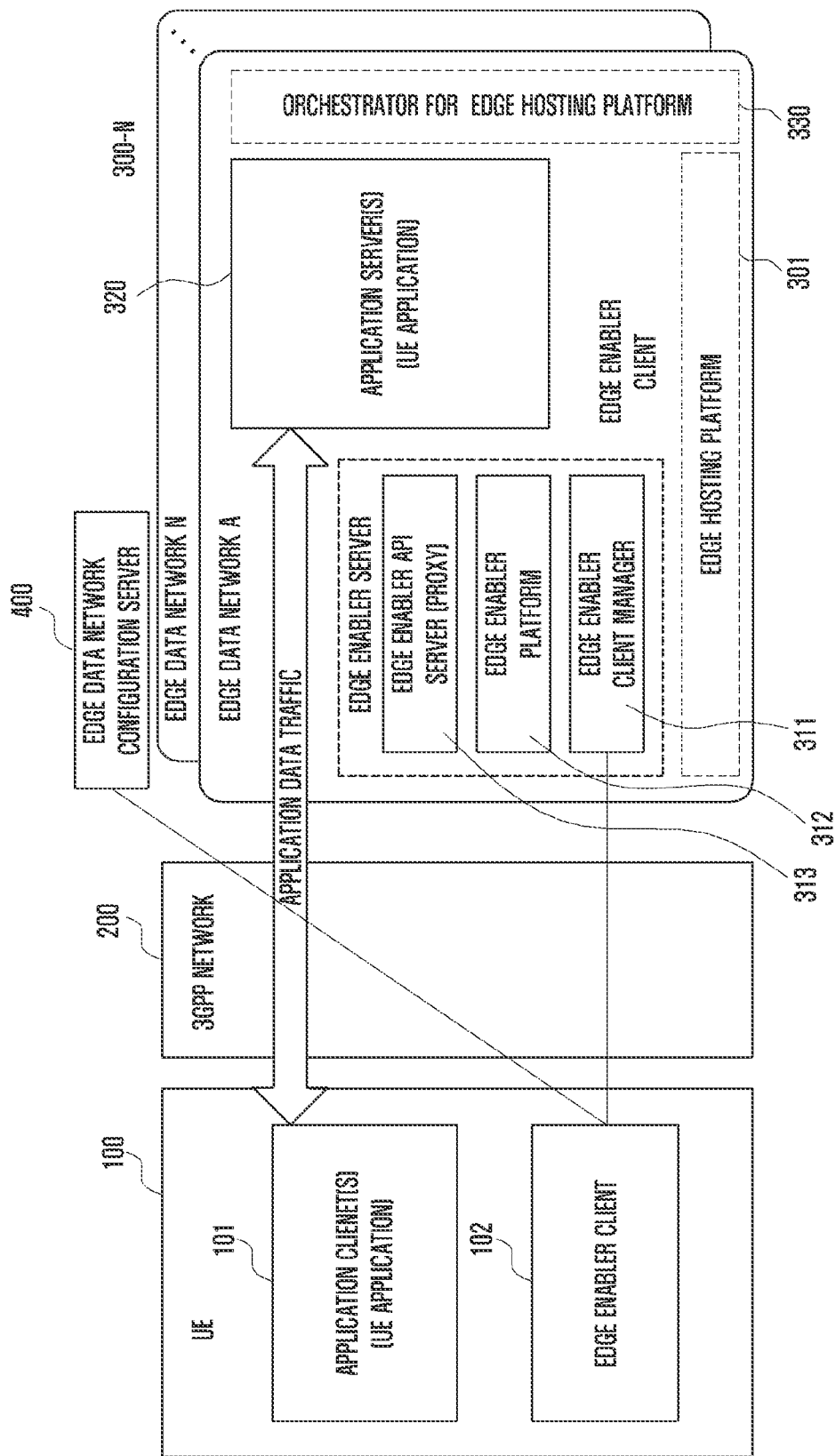
FIG. 1 illustrates an application network architecture and an interface for supporting edge computing according to an embodiment of the disclosure.

FIG. 1 illustrates an application network architecture for supporting edge computing.

Referring to FIG. 1, a user equipment (UE) 100 may include at least one application client 101 and an edge enabler client 102. The application client 101 may be an application-level client to provide an edge computing service for a user when provided with the edge computing service.

In addition, the UE 100 may include a mobile terminal (not shown in FIG. 1) to communicate with a wireless communication network, for example, at least one mobile communication network or two or more mobile communication networks.

A 3GPP network 200 is illustrated as a representative mobile communication network and may include, for example, an EPC and/or a 5GC. The 3GPP network 200 may include base stations that directly communicate with the UE 100 over the air, and may include a core network configuration above the base stations. When the 3GPP network 200 includes the 5GC, the 3GPP network 200 may include an access and mobility management function (AMF), a session management function (SMF), a policy control function (PCF), a user plane function (UPF), and the like.

When the 3GPP network 200 includes an EPC as a core network, the 3GPP network 200 may include network nodes corresponding to a 5GC.

Edge data networks may be configured through network slicing, and all edge data networks A to N may be configured in the same form. For example, in the configuration of edge data network A 300-A, an edge hosting platform 301 may be included, and an edge enabler server 310, an application server 320, and an orchestrator 330 for an edge hosting platform may be included. The edge enabler server 310 may include an edge enabler client manager 311, an edge enabler platform 312, and an edge enabler API server 313.

Network functions illustrated in FIG. 1 may be defined as follows.

3GPP network 300: May include a 3GPP radio access network and a core network.

Edge data networks 300-A, . . . , 300N: Data network of a 5G core network or a packet data network of an EPC network, which may be a data network including functions of providing an edge computing service, such as the edge hosting platform 301 and the edge enabler server 310.

UE application (Application client) 101: Application program operating on a mobile operating system of the UE 100, which may be identified by OSId and OSAppID in the 5G core network.

Application servers (or edge applications) 320: Application server program operating in a VM image or a virtualization container operating on the edge hosting platform 301, which may be a server program executed by instantiation of the VM image and may also be referred to as an edge application.

Edge data network configuration server 400: Server providing configuration information about an edge data network to the UE 100, which may be an initial access server from which the UE 100 can receive configuration information to use an MEC service.

Edge hosting platform 301: May be platform software including a virtualization layer capable of executing a plurality of edge applications. In this document, the edge hosting platform 301 may be used in the same concept as an edge hosting environment.

Orchestrator 330 for edge hosting platform: May be a management system that manages the edge hosting platform 301 and manages the lifecycle of edge application programs operating on the edge hosting platform 301. The orchestrator 330 can perform a function of an orchestrator defined in an ETSI management and network operation (MANO).

Edge enabler server 310: Server for providing an edge computing service, which may serve as a server that provides the UE 100 with a list of application programs available on the edge hosting platform 301 (edge enabler client manager), manages configuration information about edge application programs operating on the edge computing hosting platform 301, and provides edge applications with an API for a function provided by the 3GPP network.

Edge enabler client 102: Software module of the UE 100, which may be a software agent having functions for providing an edge computing service. The edge enabler client 102 may serve as a software agent that performs an authentication function for the UE to access an edge computing server, performs routing necessary for the UE application program 101 by the UE 100 receiving information provided from the edge hosting platform 301 via interworking with the edge enabler server 310, and provides information to the UE application program 101.

The disclosure can provide the following two scenarios enabling an operator to flexibly install an edge network and can disclose application network architectures and methods for implementing the scenarios.

Scenario 1. Support of Plurality of Edge Computing Platform Operators

The application network architecture for supporting edge computing of FIG. 1 may be managed by an edge computing operator separate from a mobile communication operator, and thus a plurality of separate edge computing operators may exist in one mobile communication operator network. The application network architecture for supporting edge computing of FIG. 1 may support this operator configuration.

The application network architecture illustrated in FIG. 1 may support a plurality of edge computing operators in one mobile communication network. The application network architecture enables configuration information for accessing a plurality of edge computing service operators available in one mobile communication network and edge computing networks installed by the operators to be transmitted to a UE.

The application network architecture illustrated in FIG. 1 enables configuration information for accessing an edge network service provider selected by a mobile communication operator from among a plurality of edge computing operators existing in one mobile communication network and an edge computing network installed by the selected edge network service provider to be transmitted to the UE 100.

Figure 2:
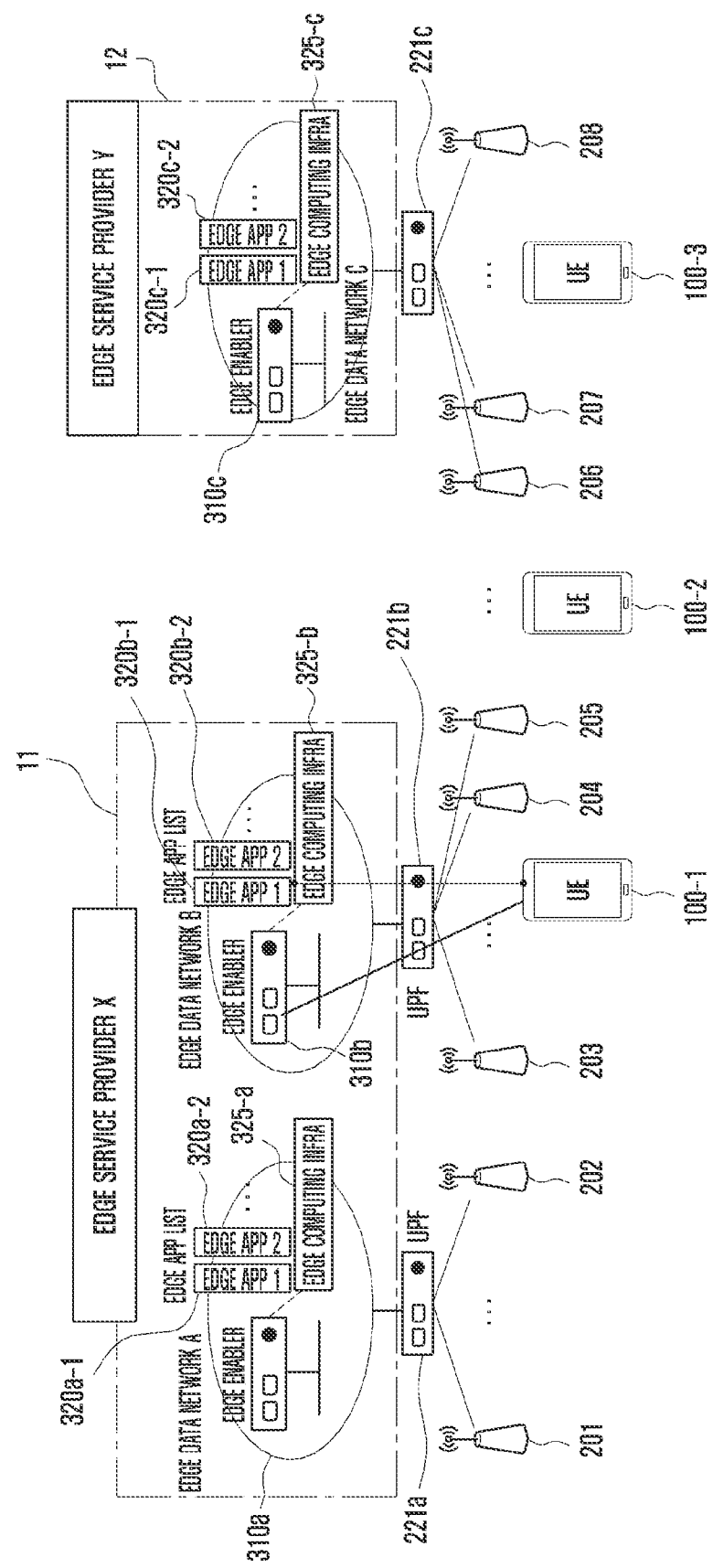
FIG. 2 illustrates a scenario for supporting a plurality of edge computing platform operators according to an embodiment of the disclosure.

A description is made with reference to attached FIG. 2.

FIG. 2 illustrates a scenario for supporting a plurality of edge computing platform operators.

Referring to FIG. 2, edge service provider X 11 and edge service provider Y 12 are included. Edge service provider X 11 is shown to have a form including edge data network A and edge data network B therein, and edge service provider Y 12 is shown to have a form including one edge data network C.

All the edge data networks (edge data networks A, B, and C) have the same configuration. For example, the edge data networks may include edge enabler servers 310*a*, 310*b*, and 310*c* and edge application servers 320*a*-1, 320*a*-2, 320*b*-1, 320*b*-2, 320*c*-1, and 320*c*-2. The edge application servers 320*a*-1, 320*a*-2, 320*b*-1, 320*b*-2, 320*c*-1, and 320*c*-2 are shown to be configured in the same form, but different application servers may be configured if necessary or depending on areas. For example, edge data network A may be configured to include a first application server, a second application server, and a third application server, and edge data network B may be configured to include only a third application server. In another example, edge data network A may be configured to include a first application server, a second application server, and a third application server, and edge data network B may be configured to include a fourth application server. In still another example, edge data network A and edge data network B may be configured to include a first application server and a second application server, and edge data network C may be configured to include a third application server and a fourth application server.

Each of the edge data networks may be connected to UEs 100-1, 100-2, and 100-3 through corresponding UPFs 221*a*, 221*b*, and 221*c* in the 5GC. The UEs 100-1, 100-2, and 100-3 may include the foregoing configuration of FIG. 1. In addition, the UEs 100-1, 100-2, and 100-3 may further include various modules for user convenience. For example, the UEs 100-1, 100-2, and 100-3 may eju include a device for providing a graphical user interface to a user, a touch device for input convenience, or a voice recognition device. As widely known, the UEs 100-1, 100-2, and 100-3 are capable of wireless access through base stations 201, 202, 203, 204, 205, 206, 207, and 208 of a mobile communication network.

As illustrated in FIG. 2, a plurality of edge computing operators may exist in one mobile communication operator network. For example, a first mobile communication operator network 11 may include edge data network A and edge data network B. In other words, one edge computing operator may configure a plurality of edge data networks within one mobile communication operator network to provide an edge network service. One edge data network may include data infrastructures 325*a*, 325*b*, and 525*c* including an edge hosting platform and an edge orchestrator, and edge enabler servers 310*a*, 310*b*, and 310*c* may provide configuration information for providing an edge computing service to the UEs 100-1, 100-2, and 100-3.

Scenario 2. Deployment of Edge Data Network by Area

The application layer architecture for supporting edge computing illustrated in FIG. 1 may support the following edge computing service deployment scenarios of a mobile communication operator.

1) Gradual Edge Computing Service Scenario Installation

Edge computing is installed only in some areas of an operator network in an initial edge computing deployment, and when the operator expands an area where edge computing is installed, an edge computing service area may increase or decrease. It is also possible for the operator to reduce the area when providing an edge computing service.

2) Local Differentiation of Edge Computing Service and Local Edge Computing Specialized Service A mobile communication operator can provide edge computing services differentiated by area. For example, when a business using edge computing is started only in a specific city, an edge computing service may be provided only in an area designated by the operator. The mobile communication operator may operate a separate edge computing service for each area and may provide different edge application services for respective areas.

3) A Mobile Communication Operator May Operate Using a Plurality of Edge Computing Service Providers or Solutions.

4) An Edge Computing Service May be Provided Only in an Area Smaller than a Service Area of a Mobile Communication Operator.

For the foregoing various deployments of edge data networks, the application network architecture illustrated in FIG. 1 allows an operator to install an edge computing service platform in each area. The application layer architecture supports a structure in which a plurality of edge data networks can be deployed, one edge data network may include an edge data network service area that is a portion of the coverage of a mobile communication operator network, and the edge data network service area may include a plurality of cells or tracking areas.

The application network architecture illustrated in FIG. 1 may support a function of configuring information about an associated edge network service area in a UE.

The application network architecture illustrated in FIG. 1 may support a function enabling a UE to identify an area related to an edge network service area.

A mobile communication operator may have various network deployment scenarios for providing edge computing according to business requirements. In the disclosure, various network deployment scenarios are divided into three scenarios as follows, and each deployment scenario are described with reference to FIG. 8 to FIG. 12.

The following three deployment scenarios may be broadly presented for mobile communication operators.

(1) Edge data network deployment scenario using Internet data network (DN) (which will be described with reference to FIG. 8 and FIG. 9)

(2) Edge data network deployment scenario using dedicated DN (which will be described with reference to FIG. 10 and FIG. 11)

(3) Edge data network deployment scenario using local dedicated DN (which will be described with reference to FIG. 12 and FIG. 13)

(1) Internet Data Network

A first deployment scenario is an edge data network deployment scenario using an Internet DN. This scenario will be described with reference to FIG. 8.

Figure 8:
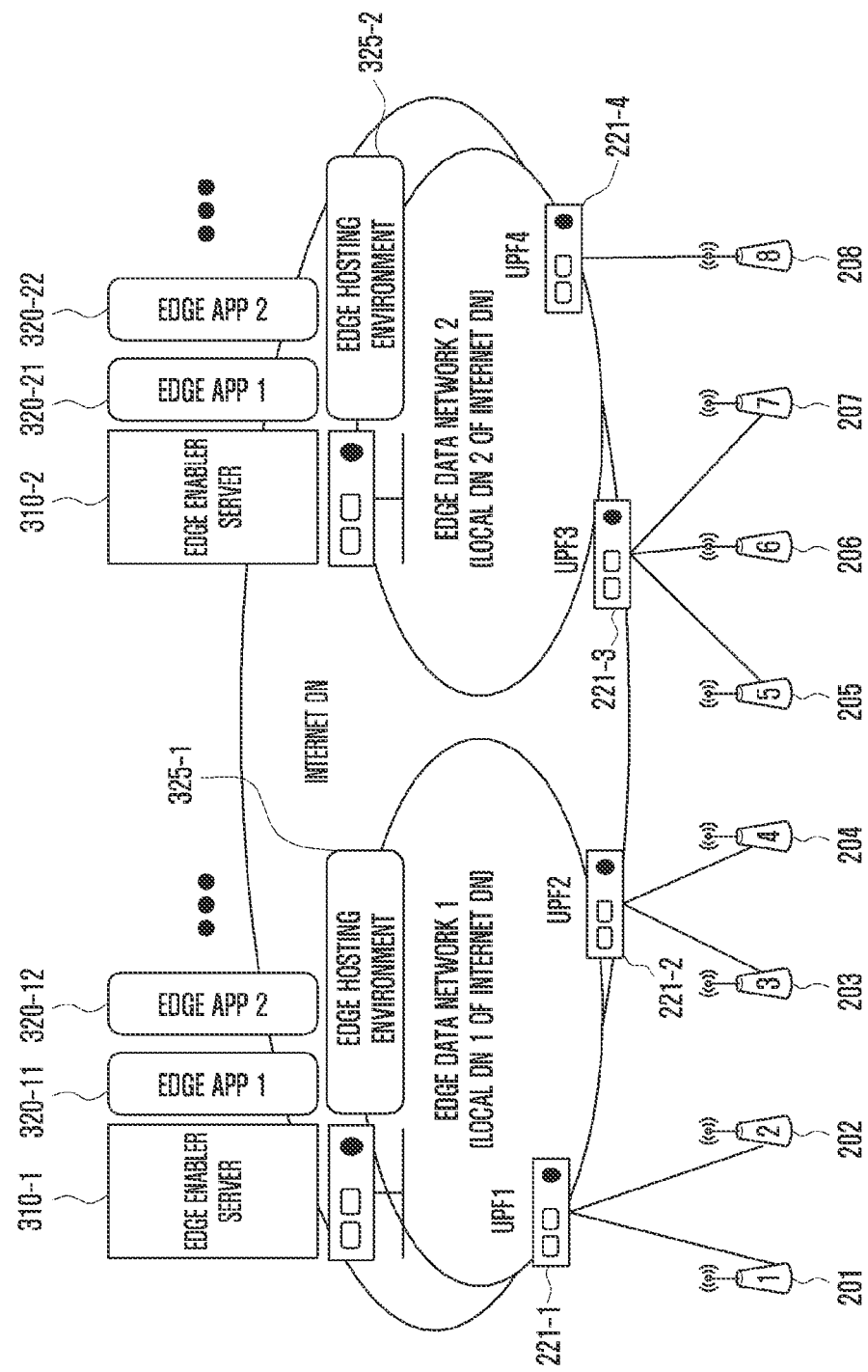
FIG. 8 illustrates a network deployment scenario Option 1A according to an embodiment of the disclosure.

FIG. 8 illustrates a network deployment scenario Option 1A according to the disclosure.

Referring to FIG. 8, an Internet DN includes a first edge data network and a second edge data network, and the first edge data network may include two different UPFs 221-1 and 221-2. The second edge data network may include two different UPFs 221-3 and 221-4.

The individual UPFs 221-1, 221-2, 221-3, and 221-4 may be connected to base stations 201, 202, 203, 204, 205, 206, 207, and 208 capable of communicating with a mobile terminal over the air. The first edge data network may include an edge hosting environment 325-1, and may include an edge enabler server 310-1 and edge applications 320-11 and 320-12 running in the edge hosting environment 325-1. The second edge data network may also include an edge hosting environment 325-2, and may include an edge enabler server 310-2 and edge applications 320-21 and 320-22 running in the edge hosting environment 325-2.

FIG. 8 shows a scenario in which a UE connects to an edge application using a data network used for Internet access. The deployment scenario according to FIG. 8 may be referred to as Option 1A. In this network deployment scenario, a separate dedicated DN for supporting edge computing does not exist, and the UE may access edge applications through the DN for Internet access (Internet DN in FIG. 8). The DN for Internet access refers to a default PDN connection in an EPC architecture, and may be a DNN specified in DNN information stored in a local configuration of the UE or a USRP rule having a match-all traffic descriptor among policies received through a URSP in the 5GC.

In the scenario illustrated in FIG. 8, the entire operator network area (PLMN area) may be the service areas of the edge data networks. For example, as illustrated in FIG. 8, edge data network 1 corresponds to an area corresponding to local DN 1 of the Internet DN, and edge data network 2 corresponds to an area corresponding to local DN 2 of the Internet DN. In this network deployment scenario, intermediate UPFs (I-UPFs) 221-1, 221-2, 221-3, and 221-4 are required to distinguish traffic for the UE to access the Internet from traffic for the UE to communicate with the edge applications 320-11, 320-12, . . . , 320-21, 320-22, and the like installed in the edge hosting environments 325-1 and 325-2. A solution using the I-UPFs may be a solution supporting an uplink classifier (UL-CL) or IPv6 multihoming.

The respective edge enabler servers 310-1 and 310-2 may represent the edge hosting environments 325-1 and 325-2), and one logical edge enabler server may exist in a local data network (DN) unless specified otherwise.

Figure 9:
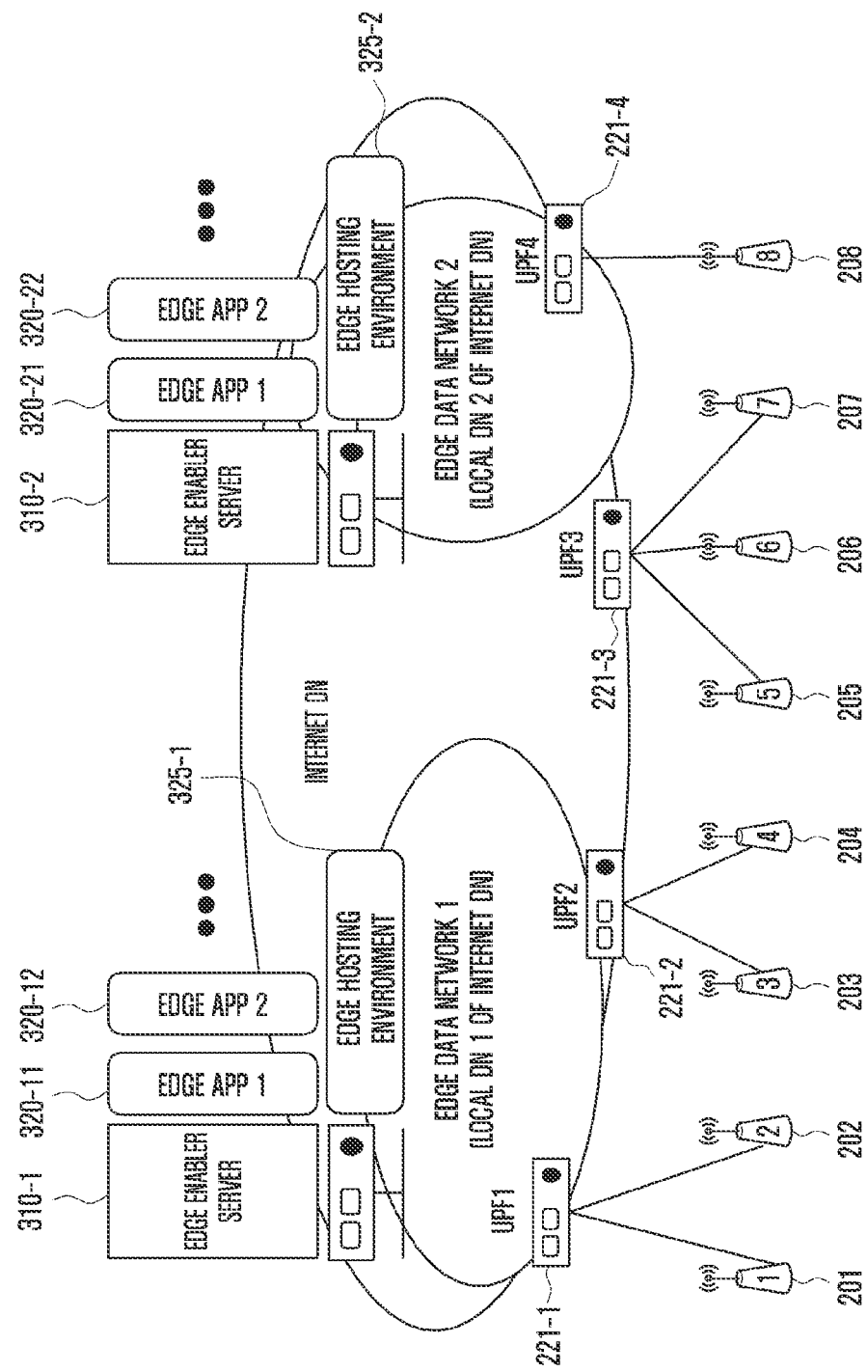
FIG. 9 illustrates a network deployment scenario Option 1B according to an embodiment of the disclosure.

FIG. 9 illustrates a network deployment scenario Option 1B according to the disclosure.

Referring to FIG. 9, an Internet DN includes a first edge data network and a second edge data network, and the first edge data network may include two different UPFs 221-1 and 221-2. The second edge data network may include one UPF 221-4. A third UPF 222-3 illustrated in FIG. 9 may be a UPF that is not connected to an edge data network.

The individual UPFs 221-1, 221-2, 221-3, and 221-4 may be connected to base stations 201, 202, 203, 204, 205, 206, 207, and 208 capable of communicating with a mobile terminal over the air. The first edge data network may include an edge hosting environment 325-1, and may include an edge enabler server 310-1 and edge applications 320-11 and 320-12 running in the edge hosting environment 325-1. The second edge data network may also include an edge hosting environment 325-2, and may include an edge enabler server 310-2 and edge applications 320-21 and 320-22 running in the edge hosting environment 325-2.

The network deployment scenario illustrated in FIG. 9 is a deployment scenario in which a UE communicates with the edge applications using an Internet DN as in the scenario illustrated in FIG. 8. The scenario illustrated in FIG. 9 is different from that illustrated in FIG. 8 in that the edge data networks do not cover the entire operator network. Referring to FIG. 9, there is no edge data network to which a UPF3 221-3 can directly connect. Accordingly, the UE cannot access an edge data network in the service area of the UPF3 221-3. The deployment scenario according to FIG. 9 may be referred to as Option 1B.

(2) Edge Data Network Deployment Scenario Using Dedicated DN

A second network deployment scenario is a deployment scenario using a dedicated DN. FIG. 10 illustrates a network deployment scenario Option 2A according to the disclosure.

Figure 10:
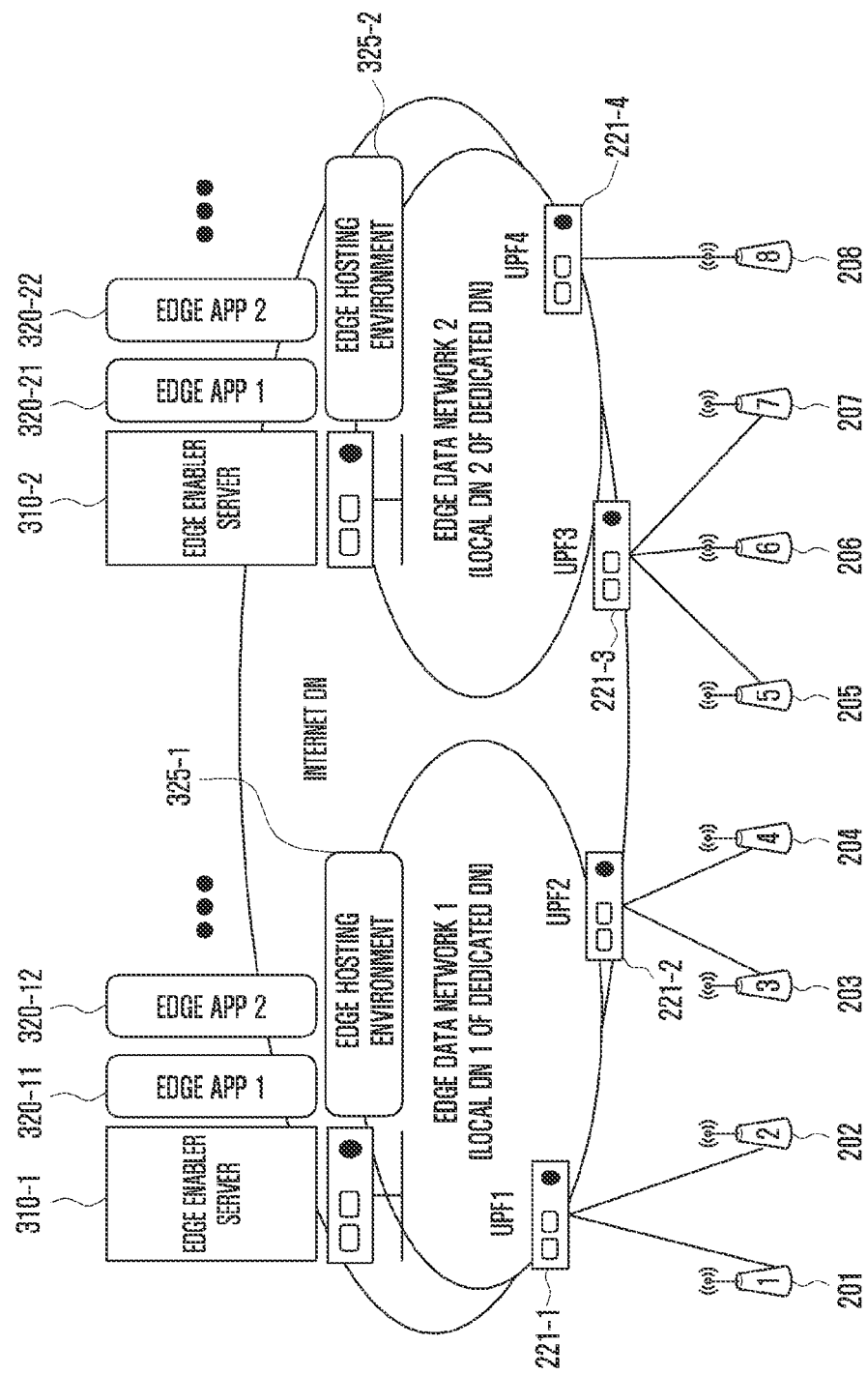
FIG. 10 illustrates a network deployment scenario Option 2A according to an embodiment of the disclosure.

Referring to FIG. 10, an Internet DN includes a first edge data network and a second edge data network, and the first edge data network may include two different UPFs 221-1 and 221-2. The second edge data network may include two different UPFs 221-3 and 221-4.

The individual UPFs 221-1, 221-2, 221-3, and 221-4 may be connected to base stations 201, 202, 203, 204, 205, 206, 207, and 208 capable of communicating with a mobile terminal over the air. The first edge data network may include an edge hosting environment 325-1, and may include an edge enabler server 310-1 and edge applications 320-11 and 320-12 running in the edge hosting environment 325-1. The second edge data network may also include an edge hosting environment 325-2, and may include an edge enabler server 310-2 and edge applications 320-21 and 320-22 running in the edge hosting environment 325-2.

In the network deployment scenario illustrated in FIG. 10, similar to the scenario shown in FIG. 8, all the edge data networks may be used in the entire service area of an operator network. The difference between the first network deployment scenario (Option 1A) illustrated in FIG. 8 and the deployment scenario of Option 2A illustrated in FIG. 10 is as follows.

In the network deployment scenario according to FIG. 10, the UE uses a separate DN, for example, a dedicated DN, to access the edge applications 320-11, 320-12, 320-21, and 320-22, instead of sharing the network with the Internet DN. A separate DN for distinguishing the edge data networks may be preconfigured in the UE (UE local configuration), or a specific DNN may be transmitted to the UE through the URSP and may be stored in the UE. In this network deployment scenario, when the UE moves from the area of edge data network 1 to the area of edge data network 2, an SMF (not shown in FIG. 10) of a 5G core network may terminate a PDU session used in edge data network 1 and may provide a method for the UE to access the nearest edge data network using an SSC Mode 2 or SSC Mode 3 solution of instructing the UE to reestablish a session with the same DNN in edge data network 2.

Figure 11:
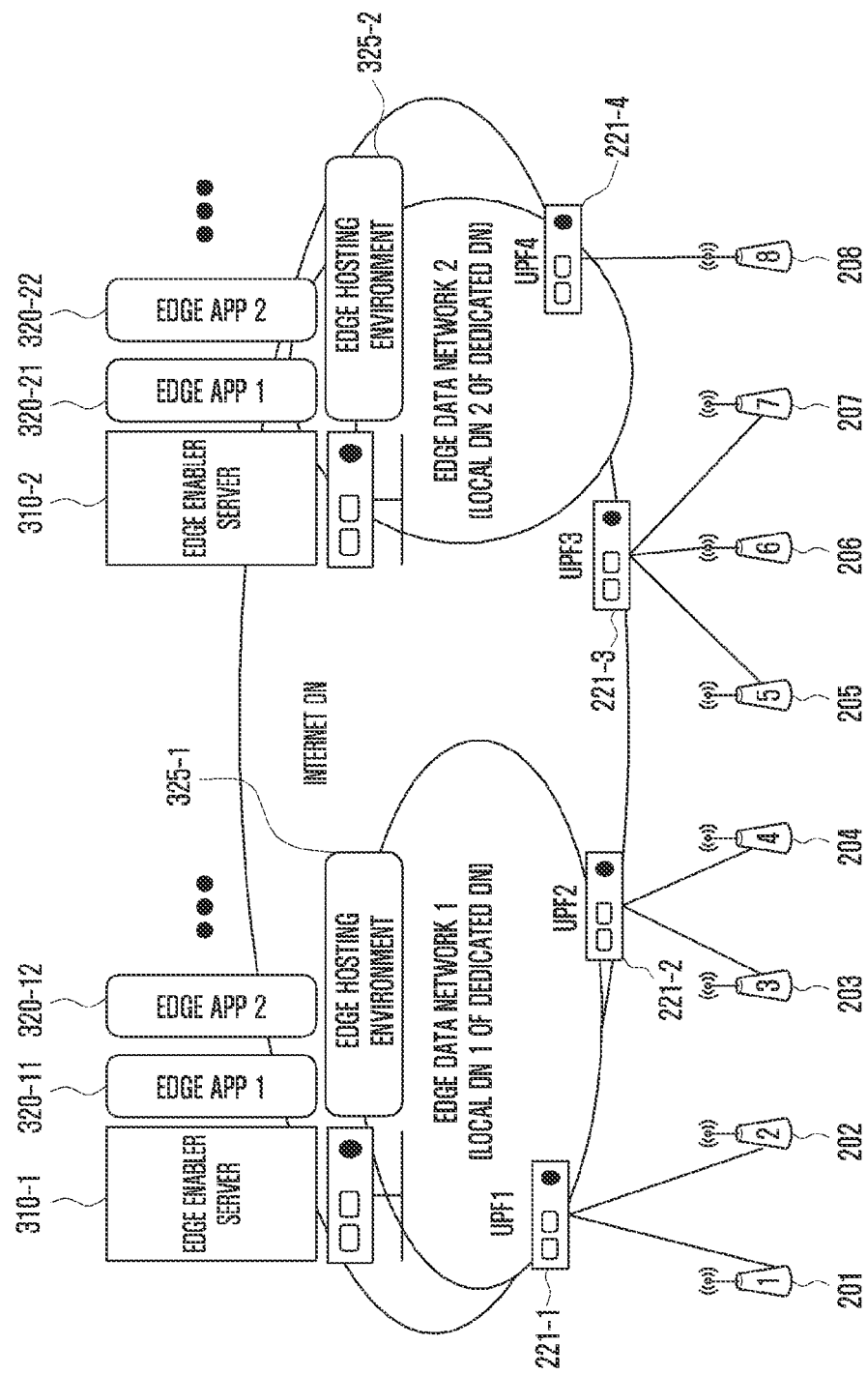
FIG. 11 illustrates a network deployment scenario Option 2B according to an embodiment of the disclosure.

FIG. 11 illustrates a network deployment scenario Option 2B according to the disclosure.

Referring to FIG. 11, an Internet DN includes a first edge data network and a second edge data network, and the first edge data network may include two different UPFs 221-1 and 221-2). The second edge data network may include one UPF 221-4. A third UPF 222-3 illustrated in FIG. 11 may be a UPF that is not connected to an edge data network.

The individual UPFs 221-1, 221-2, 221-3, and 221-4 may be connected to base stations 201, 202, 203, 204, 205, 206, 207, and 208 capable of communicating with a mobile terminal over the air. The first edge data network may include an edge hosting environment 325-1, and may include an edge enabler server 310-1 and edge applications 320-11 and 320-12 running in the edge hosting environment 325-1. The second edge data network may also include an edge hosting environment 325-2, and may include an edge enabler server 310-2 and edge applications 320-21 and 320-22 running in the edge hosting environment 325-2.

The network deployment scenario illustrated in FIG. 11 is a deployment scenario in which a UE communicates with the edge applications 320-11, 320-12, 320-21, and 320-22 using a dedicated DN as in the scenario illustrated in FIG. 10.

The scenario illustrated in FIG. 11 is different from that illustrated in FIG. 8 in that the edge data networks do not cover the entire operator network. As illustrated in FIG. 11, there is no edge data network to which a UPF3 221-3 can directly connect. Accordingly, the UE cannot access an edge data network in the service area of the UPF3 221-3.

(3) Edge Data Network Deployment Scenario Using Local Dedicated DN

Figure 12:
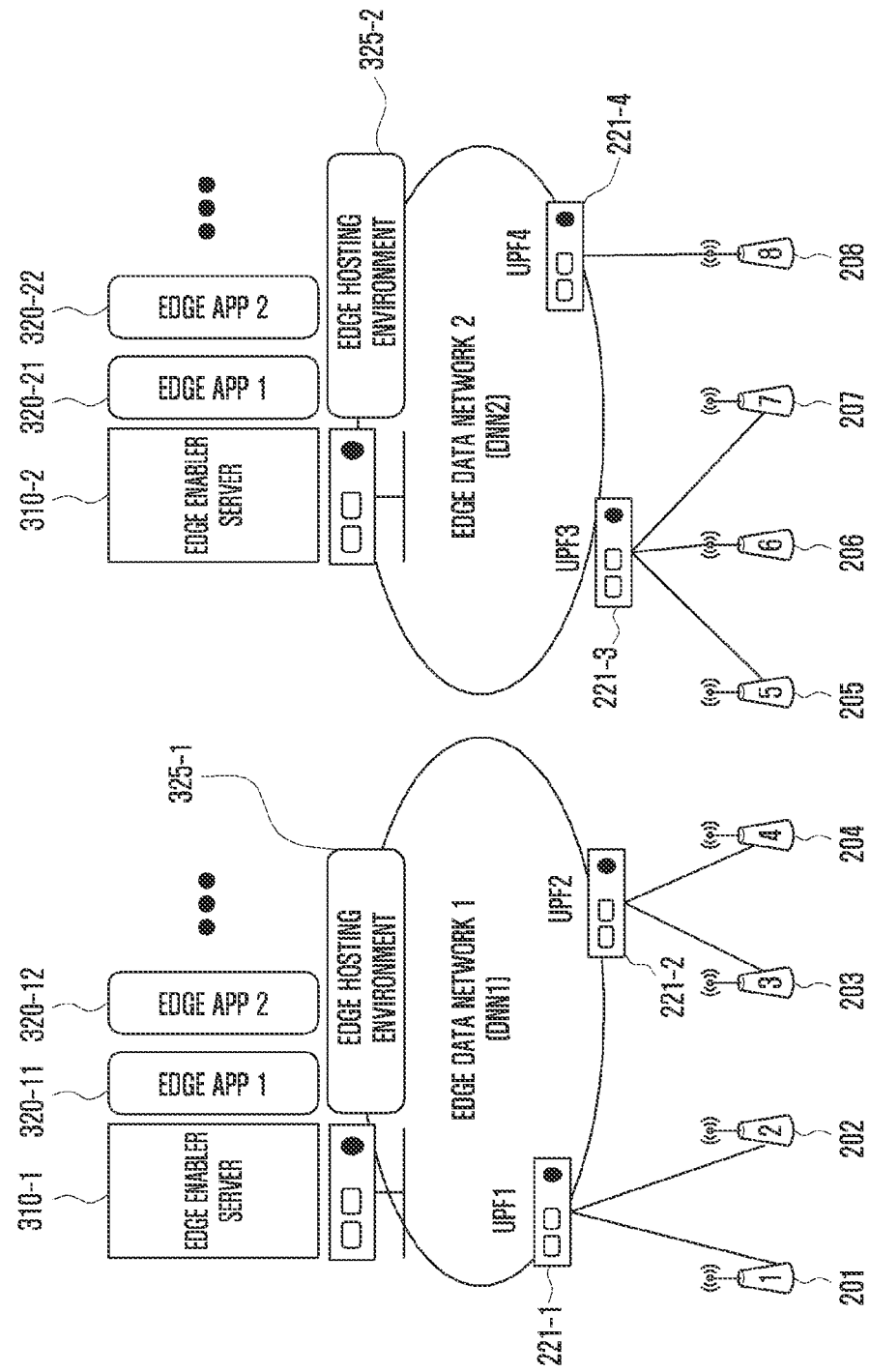
FIG. 12 illustrates a network deployment scenario Option 3A according to an embodiment of the disclosure.

FIG. 12 illustrates a network deployment scenario Option 3A according to the disclosure.

Referring to FIG. 12, a first edge data network and a second edge data network are illustrated. The first edge data network may include two different UPFs 221-1 and 221-2. The second edge data network may include two different UPFs 221-3 and 221-4.

The individual UPFs 221-1, 221-2, 221-3, and 221-4 may be connected to base stations 201, 202, 203, 204, 205, 206, 207, and 208 capable of communicating with a mobile terminal over the air. The first edge data network may include an edge hosting environment 325-1, and may include an edge enabler server 310-1 and edge applications 320-1*l* and 320-12 running in the edge hosting environment 325-1. The second edge data network may also include an edge hosting environment 325-2, and may include an edge enabler server 310-2 and edge applications 320-21 and 320-22 running in the edge hosting environment 325-2.

The network deployment scenario illustrated in FIG. 12 is a network deployment scenario in which a connection is established through a separate DN in each area. The network deployment scenario illustrated in FIG. 12 may be referred to as Option 3A. The entire service area of an operator network includes a plurality of edge data networks, and the respective edge data networks have different service areas. This configuration in which a data network has a service area is specified in a description of a LADN in TS 23.501 5.6.5. That is, in the network deployment scenario illustrated in FIG. 12, the entire service area of the operator network is covered using a plurality of LADNs. The respective edge enabler servers 310-1 and 310-2 may represent the edge hosting environments 325-1 and 325-2 in the edge data networks.

Figure 13:
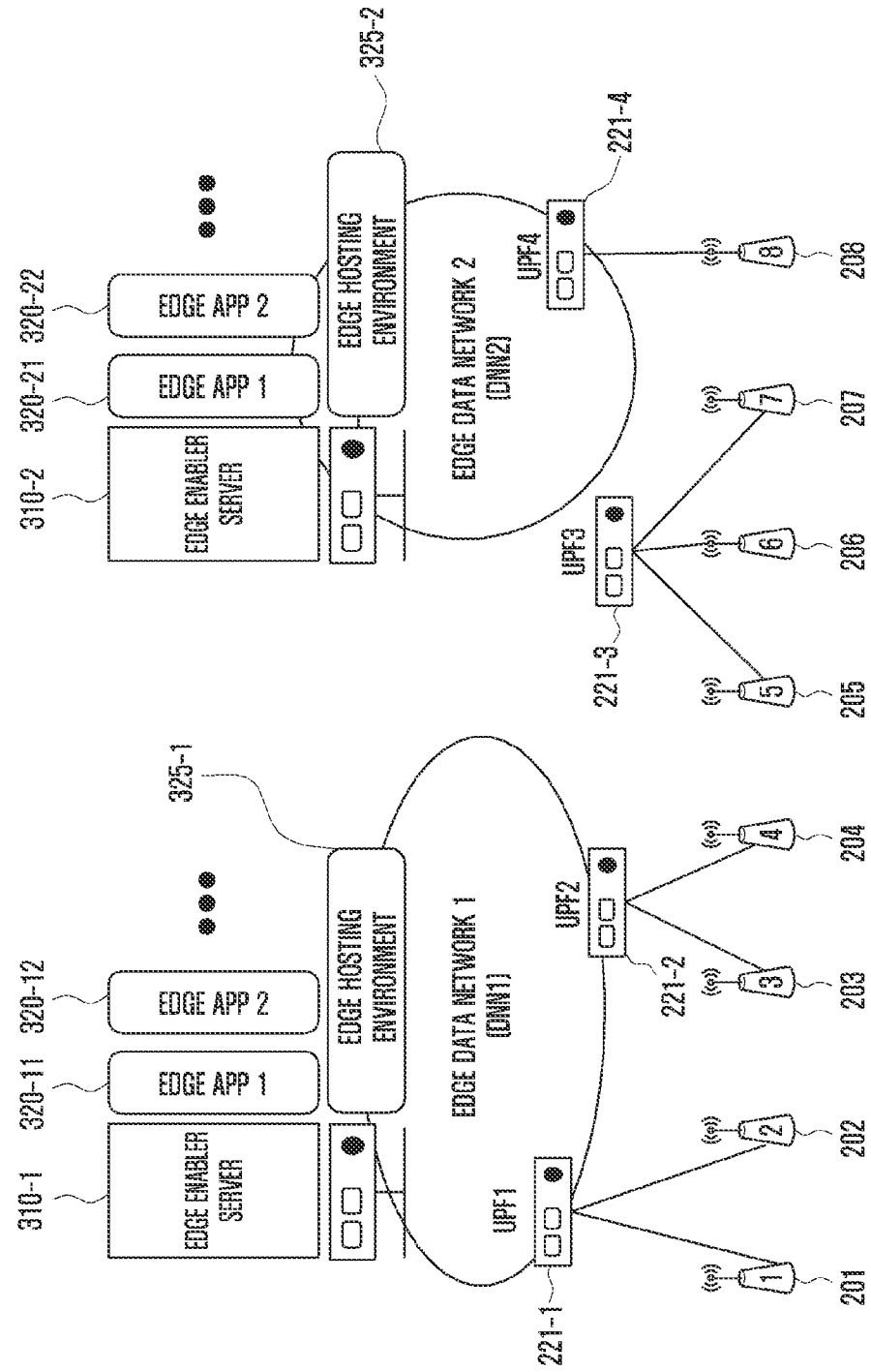
FIG. 13 illustrates a network deployment scenario Option 3B according to an embodiment of the disclosure.

FIG. 13 illustrates a network deployment scenario Option 3B according to the disclosure.

Referring to FIG. 13, a first edge data network and a second edge data network are illustrated. The first edge data network may include two different UPFs 221-1 and 221-2. The second edge data network may include one UPF 2214. A third UPF 222-3 illustrated in FIG. 13 may be a UPF that is not connected to an edge data network.

The individual UPFs 221-1, 221-2, 221-3, and 221-4 may be connected to base stations 201, 202, 203, 204, 205, 206, 207, and 208 capable of communicating with a mobile terminal over the air. The first edge data network may include an edge hosting environment 325-1, and may include an edge enabler server 310-1 and edge applications 320-11 and 320-12 running in the edge hosting environment 325-1. The second edge data network may also include an edge hosting environment 325-2, and may include an edge enabler server 310-2 and edge applications 320-21 and 320-22 running in the edge hosting environment 325-2.

The network deployment scenario illustrated in FIG. 13 is a deployment scenario in which a UE communicates with the edge applications using a LADN as in the scenario illustrated in FIG. 12. The network deployment scenario illustrated in FIG. 13 may be referred to as Option 3B. The scenario illustrated in FIG. 13 is different from that illustrated in FIG. 12 in that the edge data networks do not cover the entire operator network. Comparing FIG. 13 with FIG. 12, there is no edge data network to which a UPF3 221-3 can directly connect. Accordingly, the UE cannot access an edge data network in the service area of the UPF3 221-3.

First Embodiment

A first embodiment relates to a method and procedure for obtaining edge data network configuration information. The first embodiment is described with reference to attached FIG. 4.

Figure 4:
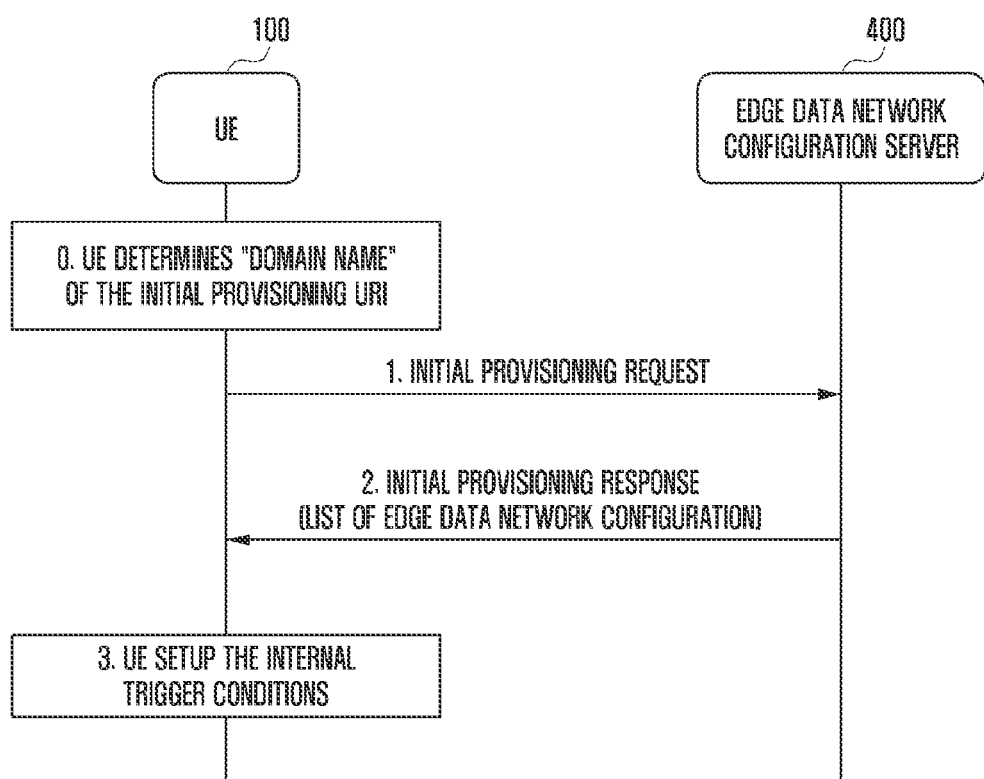
FIG. 4 illustrates a procedure for obtaining edge data network configuration information according to an embodiment of the disclosure.

FIG. 4 illustrates a procedure for obtaining edge data network configuration information according to the disclosure.

According to FIG. 4, in operation 0, a UE 100 may determine the address of an initial access server. The address of the initial access server may be expressed as a URI as follows, and the address excluding a <domain> part is fixed.

Example of initial access URI address:

http://edgeconfiguration.<domain>/provisioning

The domain address (<domain>) is determined by the following method.

1) An example of a method for configuring the domain address from a mobile network code (MNC) and a mobile country code (MCC) is as follows.

(Example) mnc015.mcc234.pub.3gppnetworks.org

The UE receives a PLMN code (PLMN identifier) included in system information (SIB) of a serving PLMN broadcast from a camped base station, and the PLMN code includes an MNC and an MCC. Upon obtaining the MNC and the MCC from the PLMN code, the UE may configure a domain address from the MNC and the MCC.

2) A method of using a domain address of an operator: The domain address may be determined using a domain address of an operator that has already been determined. A domain address mapped with an MNC and an MCC of the operator is used for this domain address, and this information is configured in advance in the UE. An example of the domain address may be, for example, a domain address on the Internet, such as sktelecom.com.

3) An access point name (APN)/data network name (DNN) may be used as <domain>. The UE may use an APN/DNN previously configured for each operator.

In operation 1, the UE 100 may transmit an initial configuration request message to an edge data network configuration server.

In operation 2, the edge data network configuration server 400 may transmit information about an edge data network to the UE 100. The edge data network may be one data network or packet data network for providing an edge computing service. The edge data network may be distinguished by a DNN or an APN. One edge data network may be connected to one or a plurality of RAN nodes. One edge data network provides a service in an edge data network service area. The edge data service area may be a tracking area, a cell list, an SMF service area, or a UPF service area which can be classified as an area by an operator on a 3GPP network. The edge data network may include network functions that support edge computing.

In the 5GC, the edge data network corresponds to one data network, and the UE can access the edge data network through a PDU session connection. In the EPC, the edge data network corresponds to one packet data network, and the UE can access the edge data network through a PDN connection.

Edge data network configuration information transmitted by the edge data network configuration server 400 to the UE 100 includes the following or some thereof.

1) Information for Establishing an Edge Data Network Session
  Data network name (DNN) or access point name (APN)
  Single network slice assistant information (S-NSSAI) and dedicated core network identifier (DCN ID)
  UE identifier (GPSI or NAI including a username and a domain name) for identifying the UE when accessing an edge data network session 2) Edge Data Network Service Area Configuration Information
  Network topology information: For example, a tracking area, a cell ID list or set, and at least one of a PLMN ID, an NPN ID, and a CAG ID which are broadcast may be included.
  Service area defined in 5G core network: For example, UPF service area or SMF service area
  Information for the UE to identify a network via a message broadcast from a base station: For example, CSG ID, CAG ID, PLMN ID, or NPN ID 3) Edge Data Network Application Layer Access Information and Authentication Information
  Edge computing enabler server address (URI)
  Information for authorization for use: Ex) OAUTH access token
  Authentication method for application layer authentication
  Identifier of a service provider operating an edge data network Second Embodiment A second embodiment relates to an edge data network discovery method.

A UE may distinguish an edge data network by identifying a tracking area and a cell list from LADN information received in a registration procedure. The UE may receive the LADN information from a network through the registration procedure or a UE configuration update (UCU) procedure. When using an LADN for an edge computing service, the UE may identify whether an LADN DNN is a DNN for supporting edge computing. Further, the UE may identify LADN service area information included in the LADN information and may identify (determine) whether the UE is in the edge data network.

According to another method for the UE to identify (determine) the service area of an edge data network, the UE may identify the service area of an edge data network, based on a spatial validity condition included in a UE route selection policy (URSP) provided by a PCF of a 5GC network to the UE. When a DNN for accessing an edge computing service is configured, the UE may identify a spatial validity condition transmitted along with a related URSP policy and may identify whether a cell or tracking area on which the UE currently camps in a 3GPP network is within a spatial validity area, thereby identifying whether there is an available edge data network.

Third Embodiment

A third embodiment relates to a method for establishing an edge data network session. The third embodiment may be described with reference to FIG. 5.

Figure 5:
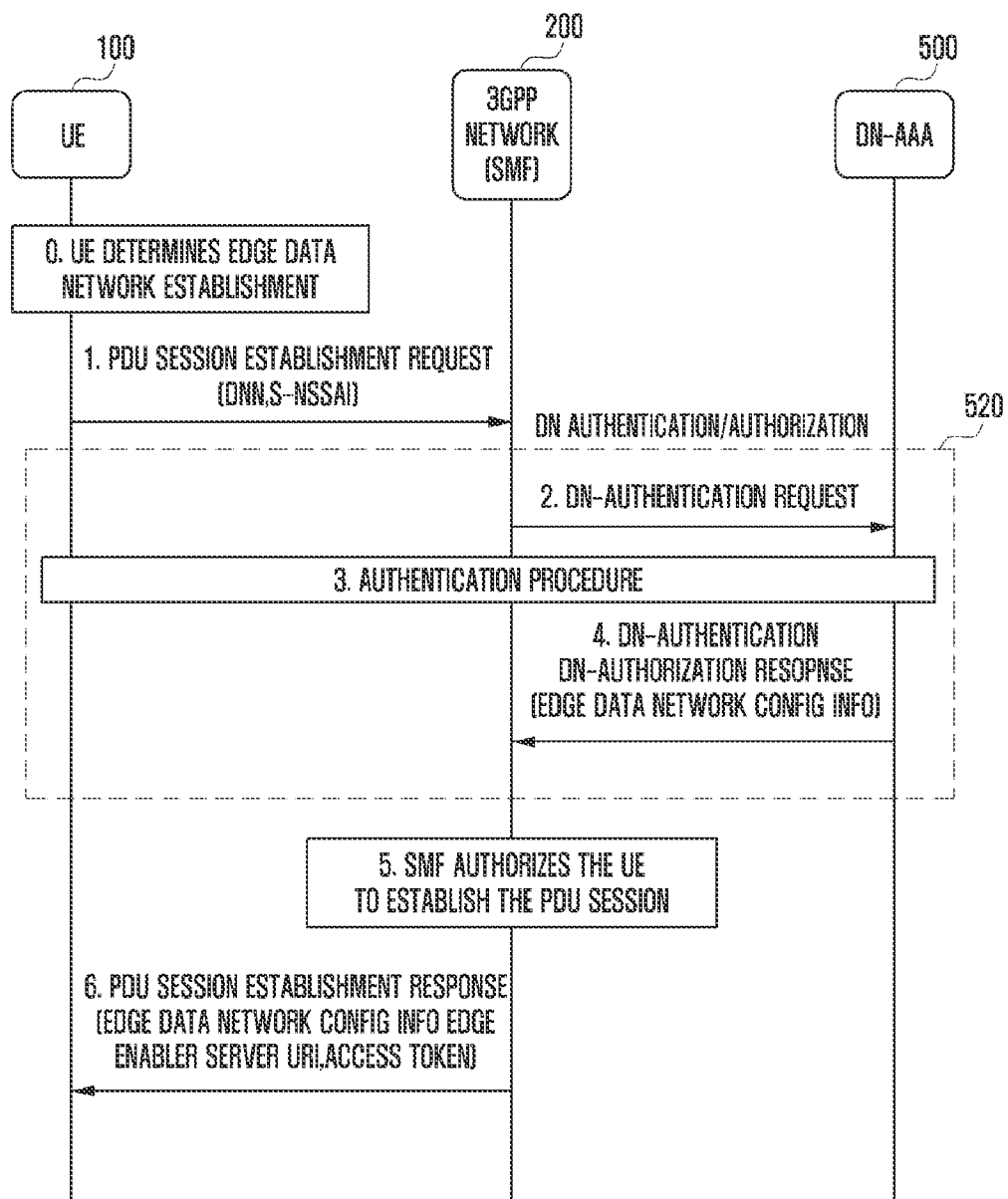
FIG. 5 illustrates an edge data network session establishment procedure according to an embodiment of the disclosure.

FIG. 5 illustrates an edge data network session establishment procedure according to the disclosure.

According to FIG. 5, an edge data network generation procedure through a PDU session establishment procedure is performed according to the following operations.

In operation 0, it may be determined to generate an edge data network of a UE 100. The UE 100 may determine to generate the edge data network. The UE 100 may discover an edge data network service area by identifying whether the UE 100 is in the edge data network area according to the description of the second embodiment and may identify (determine) whether a base station on which the UE 100 camps belongs to the edge data network of the UE 100. That is, it is possible to identify (determine) whether the base station on which the UE 100 camps is an edge data network service area described in the second embodiment. When it is determined that the UE 100 is in the edge data network area, the UE 100 may determine to establish a session for accessing the edge data network.

Operation 1. Transmission of Session Establishment Request Message

When the UE 100 determines to establish the session for accessing the edge data network, the UE 100 may transmit a session establishment request message to a 3GPP network 200. When the 3GPP network is the 5GC, the UE 100 may transmit a PDU session establishment request message to an SMF 200. The PDU session establishment request message may include the following information.

A DNN, an S-NSSAI, a UE identifier, an edge data network usage indicator, and edge data network operator information may be included.

The identifier of the UE may be a GPSI, and the GPSI may follow a network access identifier (NAI) format in the form of username@domainname.

Operation 2. DN-AAA Use Authorization Request for Session Establishment

The SMF 200 receiving the session establishment request may determine whether to perform a procedure for requesting authorization for use from a DN-AAA server 500 in view of the DNN, the S-NSSAI, and the UE identifier (e.g., the GPSI) in the NAI format received from the UE 100.

The SMF 200 may identify (determine) whether a preconfigured domain name or a domain name received from a PCF (not shown in FIG. 5) and configured matches a domain name included in the UE identifier in the NAI format and may identify (determine) whether a use authorization request is transmitted to the DN AAA server 500.

The SMF 200 may identify (determine) whether the DNN is configured for edge computing, that is, may determine whether the DNN matches a preconfigured DNN or a DNN received from the PCF and configured and may identify (determine) whether the use authorization request is transmitted to the DN AAA server 500. The UE identifier may be included in a use authorization request message transmitted by the SMF to the DN-AAA server 500.

Operation 3. Authentication Procedure for Session Establishment

The UE 100 and the DN-AAA server 500 may perform an authentication procedure for session establishment. Here, the UE 100 and the DN-AAA server 500 may perform the authentication procedure according to an extensible authentication protocol (EAP: RFC 3748).

Operation 4. DN-AAA Use Authorization Response for Session Establishment

The DN-AAA server 500 may receive the use authorization request message and may determine whether to authorize use through the UE identifier and a policy and configuration information of the DN-AAA server 500 included in the request message. When the DN-AAA server 500 determines authorization for use, the DN-AAA server 500 may transmit a use authorization message to the SMF 200. The DN-AAA server 500 may transmit a DN profile index.

The DN-AAA server 500 may transmit an application layer address (e.g., a URI) of an edge enabler server that the UE 100 accesses via an application layer or a domain address (FQDN) for generating an application layer address to the SMF 200 through the UE identifier and the policy and the configuration information of the DN-AAA server 500.

The DN-AAA server 500 may transmit edge data network configuration information of the UE 100. The edge network configuration information may be the same as that described in the first embodiment.

Operation 2 to operation 4 described above may be collectively referred to as an authentication operation. That is, reference numeral 520 may correspond to an operation in which the DN-AAA server 500 authenticates the UE 100 through the 3GPP network 200.

Operation 5. Authorization for Session Establishment by SMF 200

The SMF 200 may determine whether to authorize the UE 100 to use a session. When a session use authorization request is transmitted to the DN-AAA server 500, the SMF 200 may determine whether to authorize use of the session requested by the UE 100 in view of a result included in a use authorization response message from the DN-AAA server 500.

The DN-AAA server 500 may transmit edge computing-related configuration information via the use authorization response message. The edge computing-related configuration information may include edge data network application layer access information and authentication information in the edge data network configuration information described in the first embodiment.

The SMF 200 may determine whether to authorize the use of the session, based on the DNN, the S-NSSAI, and the UE identifier transmitted by the UE, according to an autonomous configuration thereof. In this case, the SMF 200 has edge data network application layer access information and authentication information among locally configured edge data network configuration information.

The SMF 200 may receive a DN authorization profile index from the DN-AAA server 500. In this case, the DN-AAA server 500 may receive a policy and charging control (PCC) rule related to the policy control function (PCF) and a session management-related policy. The SMF 200 may receive edge computing-related configuration information of the UE 100 from the PCF. The edge computing-related configuration information may include edge data network application layer access information and authentication information in the edge data network configuration information described in the first embodiment.

When determining to authorize the UE 100 to use the session, the SMF 200 may transmit a successful session establishment response message in operation 6, and otherwise, the SMF 200 may transmit a session establishment response message along with an indication of rejecting the session.

Operation 6. Transmission of Session Establishment Response Message

When the SMF 200 determines to authorize the UE to use the session, the SMF may transmit a session establishment response message for authorizing session establishment to the UE. The session establishment response message may include edge data network application layer access information. As described in operation 5, the edge data network application layer access information may be information received from the DN-AAA server 500, information autonomously configured by the SMF 200, or information received from the PCF.

Fourth Embodiment

A fourth embodiment relates to a procedure for accessing an edge enabler server. The fourth embodiment describes the procedure illustrated in FIG. 6.

The fourth embodiment is described with reference to attached FIG. 6.

Figure 6:
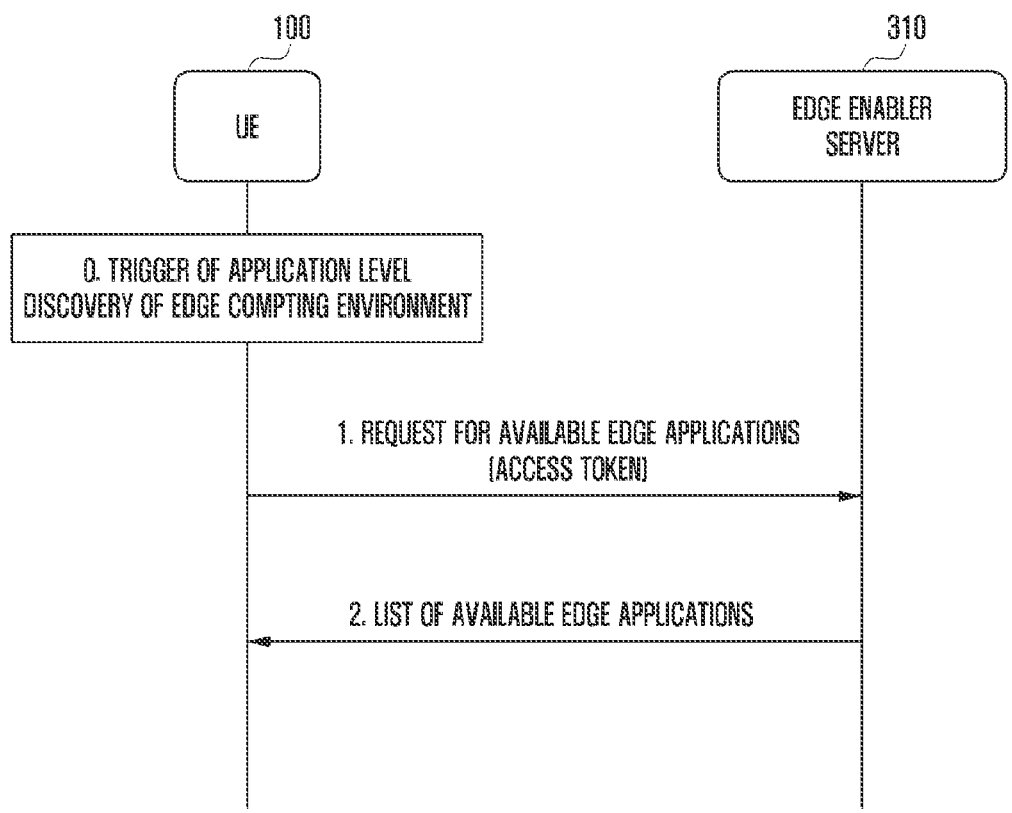
FIG. 6 illustrates a procedure for requesting and obtaining edge application information according to an embodiment of the disclosure.

FIG. 6 illustrates a procedure for requesting and obtaining edge application information according to the disclosure.

A UE 100 may identify an application level discovery trigger condition in an edge computing environment for accessing an edge enabler server 310 in operation 0. The trigger condition for accessing the edge enabler server is as follows.

1) When the following conditions are satisfied, the UE 100 may transmit a request message to the edge enabler server 310 via an application layer message.

2) The transmission may be periodically performed according to an autonomous policy of the UE 100.

3) When an edge data network is completely established

4) When the UE 100 detects entry into an edge data network service area

5) When information necessary for an application layer is requested from the UE 100 through an edge enabling layer (or an API provided by an agent to an upper application layer)

6) When it is determined that information necessary for a URSP handling layer needs to be received Operation 1. Edge Application Information Request Message The UE 100 may transmit an edge application information request message to the edge enabler server 310. The edge application information request message may include the following information.

1) An operating system installed in the UE 100 and a requested application program of the UE 100

2) Identifier and version information about software responsible for an enabling function of the UE 100

3) An access token including authorization and authentication information allowing the UE 100 to access an edge computing resource, which is possessed by an enabling agent of the UE 100

4) Information about an edge application program requested by the UE 100, for example, a list of edge application programs currently available or installed in an edge hosting platform.

Operation 2. Edge Application Information Response Message

When receiving the edge application information request message from the UE 100, the edge enabler server 310 may identify access token information and may examine authentication information. The edge enabler server 310 may identify the authority of the UE 100 and may transmit information requested by the UE 100 to the UE 100. The information transmitted to the UE 100 includes information necessary for the UE 100 to provide an edge computing service, and examples of the necessary information are as follows.

1) A list of available edge application programs and configuration information required for the UE 100 in the edge application programs. For example, a DNS server address, the IP address of an edge application program, and an FQDN or a URL may be included.

2) A protocol for efficient network transmission with an edge application program and configuration information therefor, for example, TCP or UDP preference, IP version information, and HTTP protocol version information, may be included. In addition, configuration information for transport protocol optimization, for example, initial TCP CWND size information, may be further included.

3) A list of UE applications that an edge computing operator proposes installing on the UE Fifth Embodiment A fifth embodiment illustrates the configuration of an edge data network using an LADN. The fifth embodiment is described with reference to attached FIG. 7.

Figure 7:
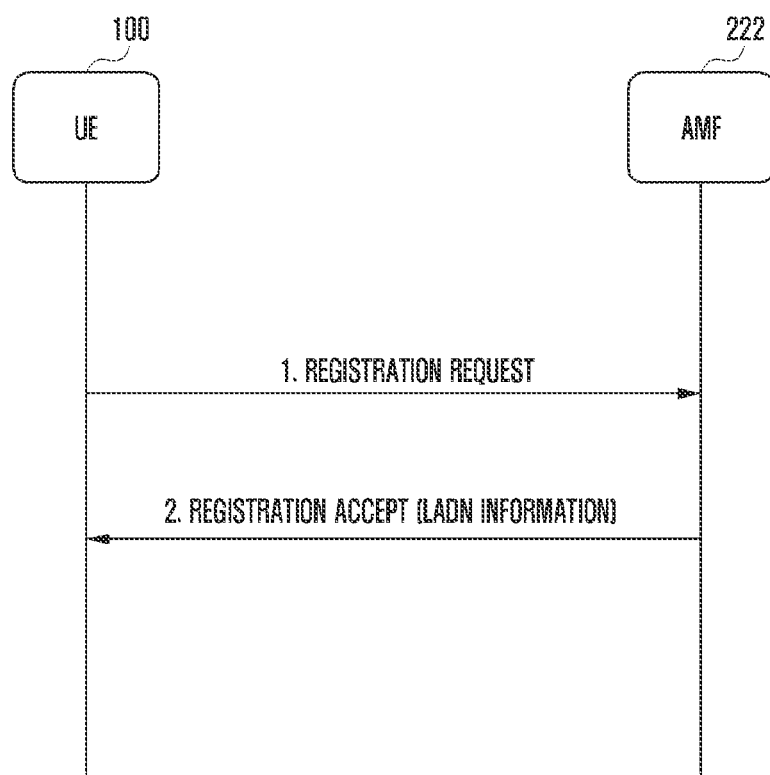
FIG. 7 illustrates a procedure in which a UE obtains LADN information through a registration procedure in a 5GC network according to an embodiment of the disclosure.

FIG. 7 illustrates a procedure in which a UE obtains LADN information through a registration procedure in a 5GC network according to the disclosure.

An edge data network for supporting edge computing may be defined as a 5GC LADN. When the edge data network is defined as the 5GC LADN, a UE may receive LADN information in a registration procedure as in the procedure of FIG. 7. The LADN information may include information about an LADN DNN and an LADN service area. The LADN service area may be designated as follows.

1) Where the LADN area is designated with a tracking area list

2) Where the LADN area is the same as the entire area of a current operator

3) Where the LADN area is the same as a current registration area

4) Where the LADN area is the same as an allowed area

5) Where the LADN area is a specific PLMN ID

6) Where the LADN service area is configured with a cell list

7) Where the LADN area is configured with a specific CAG-ID or a list thereof.

8) Where the LADN area is an RAN notification area (RNA)

When performing the registration procedure in operation 1, the UE 100 may transmit a registration request message.

In operation 2, an access and mobility management function (AMF) 222 of a 5GC network may transmit an indicator indicating the type of the LADN area and the LADN area to the UE 100. For example, when the LADN area is the same as a current registration area, the AMF 222 may transmit a registration accept message of the registration procedure including an indicator indicating that the LADN area is the same as the current registration area. Alternatively, the AMF 222 may transmit the message including an indicator that the LADN area is included in an LADN service area provided in the current registration area. When the LADN area is the same as the entire area of the current operator, the AMF 222 may include, in the LADN information included in the registration accept message of the registration procedure, an indicator indicating that the LADN service area is available in an area to which a current PLMN and an equivalent network (equivalent PLMN) belongs. When the LADN area is available in an area where a specific equivalent PLMN among current PLMNs is broadcast, the AMF 222 may transmit the registration accept message including a corresponding indicator and equivalent PLMN ID information to the UE 100. When the LADN service area is configured with the cell list, the AMF 222 may transmit the cell list as LADN service area information.

Sixth Embodiment

A sixth embodiment illustrates a procedure performed in a UE, an operator network, and an application layer in the network deployment scenarios described with reference to FIG. 8 to FIG. 13. The sixth embodiment is described with reference to attached FIG. 14.

Figure 14:
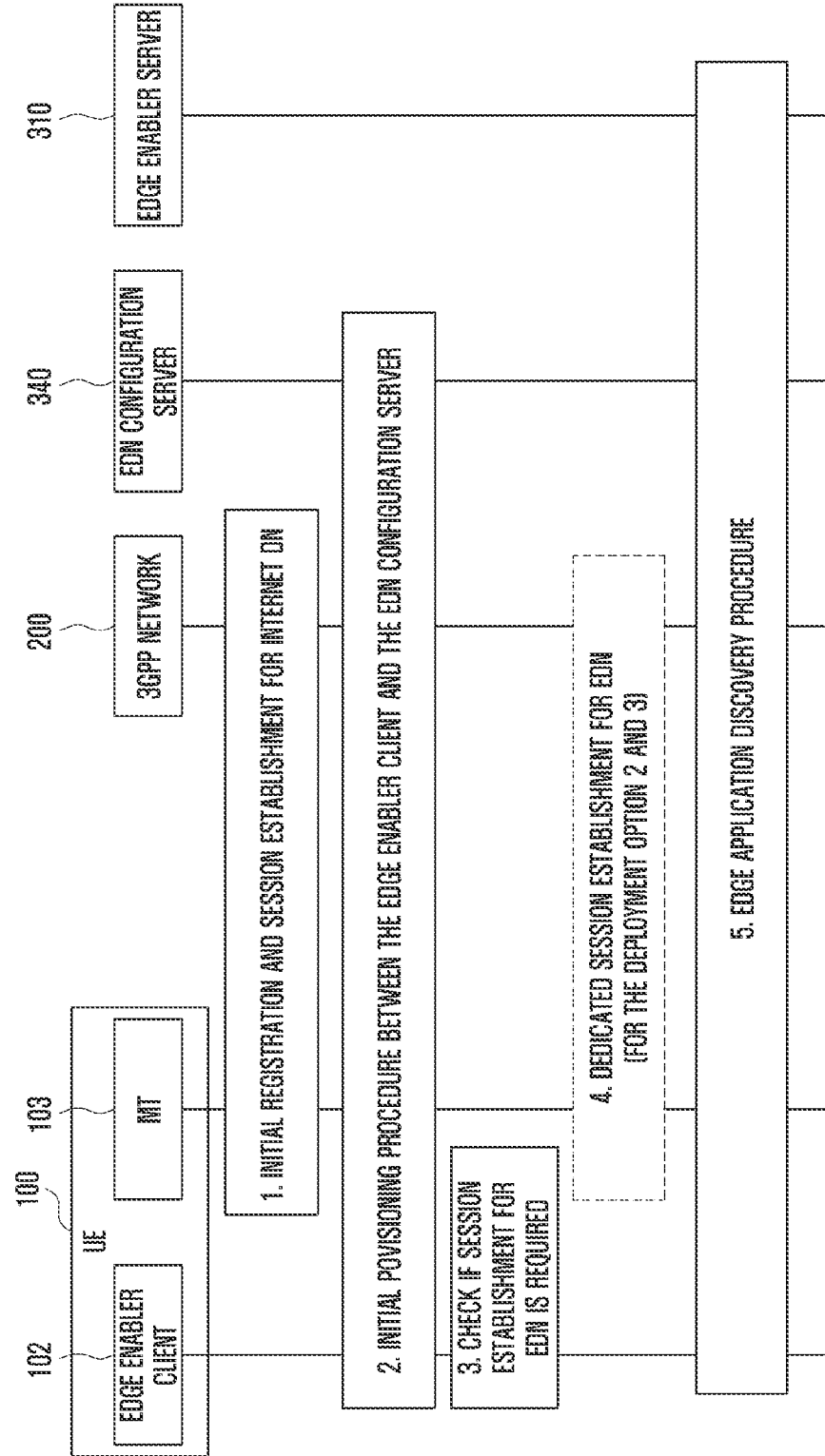
FIG. 14 illustrates a procedure performed when a UE is powered on according to an embodiment of the disclosure.

FIG. 14 illustrates a procedure performed to receive an edge computing service when a UE is powered on according to the disclosure.

This embodiment illustrates a power-on procedure commonly applied to various deployment scenarios. In each operation, actions that may vary depending on the deployment scenarios are compared in a description.

In operation 1 of FIG. 14, a mobile terminal (MT) 103 performing a modem function of a UE 100 may perform a procedure for initial registration for a 3GPP network 200 and session establishment.

This procedure may include both of a case in which the UE accesses the EPC and a case in which the UE 100 accesses the 5GC. When the UE 100 accesses the EPC, the UE 100 and a 3GPP network may perform an initial attach procedure. When the UE 100 accesses the 5GC, the UE 100 and the 3GPP network 200 may perform an initial registration procedure and a PDU session establishment procedure.

Both when the UE 100 accesses the EPC and when the UE 100 accesses the 5GC, the UE 100 may access the Internet through the procedure 1, and a connected Internet network may be referred to as an "Internet DN".

When successfully performing operation 1, the UE 100 may perform an initial provisioning procedure with an EDN configuration server 340 located in the "Internet DN" in operation 2. This procedure is the same as the procedure described in the first embodiment.

When receiving configuration information from the EDN configuration server in operation 2, the UE 100 may identify whether DNN (or APN) information designated as an EDN is a currently established PDU session in operation 3. That is, the UE 100 may determine whether the DNN (or APN) information is a PDU session established in operation 1. When an operator supports edge computing in the same DN as a DN that accesses the Internet as in the network deployment scenario 1A or 1B, the EDN configuration information configured by the EDN configuration server 340 is DNN information the same as that of a DN configured in operation 1. When a DNN (or APN) for the currently established session in the UE 100 is the same as the EDN configuration information, the UE 100 does not establish a separate session.

When the operator has a network deployment scenario, such as the network deployment scenario 2A, 2B, 3A, or 3B, the UE 100 may need to establish a separate session to access an edge application.

When a PDU session (or PDN connection) corresponding to a DNN (or APN) specified in the configuration information received by the UE 100 from the EDN configuration server 340 is not established, the UE 100 may determine that it is needed to establish a PDU session. Here, the PDU session (or PDN connection) to be established may or may not be provided depending on the area. In the network deployment scenario 2B or 3B, since it may be impossible for the UE 100 to currently establish a PDU session, the UE 100 may determine whether to establish a session by identifying service area information for each DNN specified in an EDN configuration and the current location of the UE in the network in order to determine whether it is possible to establish a DNN (or APN) specified in the EDN configuration in a current area.

When the UE 100 determines that the UE 100 is currently within an EDN service area, the UE 100 may transmit a request for establishment of a PDU session (or PDN connection) to the 3GPP network and may establish a PDU session (or PDN connection) in the 3GPP network.

When the initial provisioning procedure according to operation 2 is performed by a trigger condition rather than occurring after the initial registration procedure (operation 1), a dedicated DNN (or APN) specified in the EDN configuration information may already be established by the UE. When the session corresponding to the DNN for EDN configuration specified in the EDN configuration information has already been established in the UE 100, the UE 100 does not initiate a session procedure according to operation 4.

When the UE 100 determines that additional session establishment is not necessary in operation 3 or when additional session establishment is successfully performed in operation 4, the UE 100 may identify whether there is an edge enabler server 310 available in the current area. When there is an edge enabler server 310 available in the current area, the UE 100 may transmit a request to the edge enabler server 310 received with the EDN configuration information in operation 5. A detailed procedure of operation 5 may follow the procedure of FIG. 6.

Figure 15:
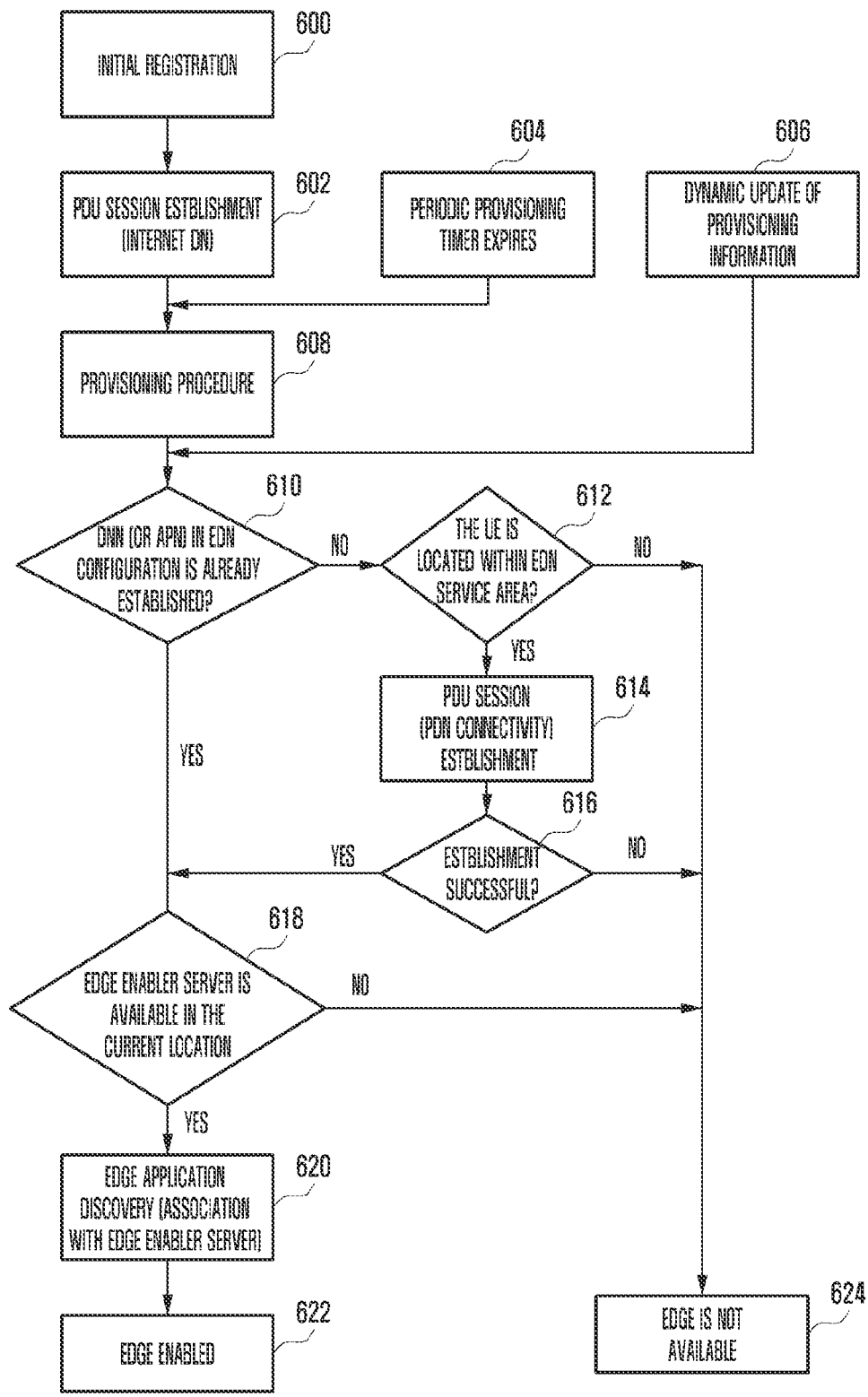
FIG. 15 is a control flowchart in a UE when the UE accesses an edge enabler server according to an embodiment of the disclosure.

Details of the UE 100 determining to initiate establishment of a PDU session (PDN connection) according to the received configuration information to access the edge enabler server 310 with the configuration information after receiving the configuration information and determining to access the edge enabler server 310 may follow FIG. 15.

FIG. 15 is a control flowchart in a UE when the UE accesses an edge enabler server according to an embodiment of the disclosure.

According to FIG. 15, in an initial start, when a network to be connected is a 5GC, a UE 100 may perform an initial registration procedure in operation 600 and may establish a PDU session for connecting to an Internet DN in operation 602. However, in an initial start, when the network to be connected is an EPC, the UE 100 may perform an initial attach operation in operation 600 and may establish a PDU session for connecting to an Internet DN in operation 602. Subsequently, an enabler client 102 of the UE 100 may initiate an initial provisioning procedure in operation 608.

When the UE periodically receives the initial provisioning procedure, for example, in operation 604, in addition to a case where the initial provisioning procedure performed in the initial start or when provisioning information is dynamically updated, for example, in operation 606, the UE 100 may determine whether a DNN (or APN) received as part of EDN configuration information is a PDU session currently established in the UE 100.

Specifically, when the UE 100 periodically receives the initial provisioning procedure in operation 604, the UE 100 may perform a provisioning procedure in operation 608 and may then proceed to operation 610.

When the provisioning information is dynamically updated in operation 606, the UE 100 may proceed to operation 610.

When the DNN (or APN) received by the UE 100 as part of the EDN configuration information is not currently established in the UE 100 (No in operation 610), the UE 100 may determine whether a PDU session (PDN connection) is available in a current area in operation 612. When a PDU session (PDN connection) is not available in the current area (No in operation 612), the UE 100 proceeds to operation 624 and does not initiate a PDU session (PDN connection). When it is possible to establish a PDU session (PDN connection) in the current area (Yes in operation 612), the UE 100 may proceed to operation 614 of the UE 100 and may initiate establishment of the PDU session. The UE 100 may successfully establish the PDU session (PDN connection) (Yes in operation 616). When the UE 100 cannot successfully establish the PDU session (PDN connection) (No in operation 616), the UE 100 proceeds to operation 624 and does not initiate a PDU session (PDN connection).

When the PDU session (PDN connection) is successfully established in the current UE 100 or the PDU session (PDN connection) is established (Yes in operation 616), the UE 100 may determine whether an edge enabler server 310 is available in the current location of the UE 100 in operation 618. When the edge enabler server 310 is available in the current location of the UE 100 (Yes in operation 618), the edge enabler client 102 of the UE 100 may transmit an edge application discovery request message to the edge enabler server 310 in operation 620. When receiving a response to the message, the UE 100 may receive a list of available edge applications and configuration information about the edge applications in operation 622.

When the DNN (or APN) received by the UE 100 as part of the EDN configuration information is not currently established in the UE 100 (No in operation 610), the UE 100 may determine whether a PDU session (PDN connection) is available in a current area in operation 612. When a PDU session (PDN connection) is not available in the current area (No in operation 612), the UE 100 proceeds to operation 624 and does not initiate a PDU session (PDN connection). When it is possible to establish a PDU session (PDN connection) in the current area (Yes in operation 612), the UE 100 may initiate establishment of the PDU session of the UE 100 in operation 614.

Figure 16:
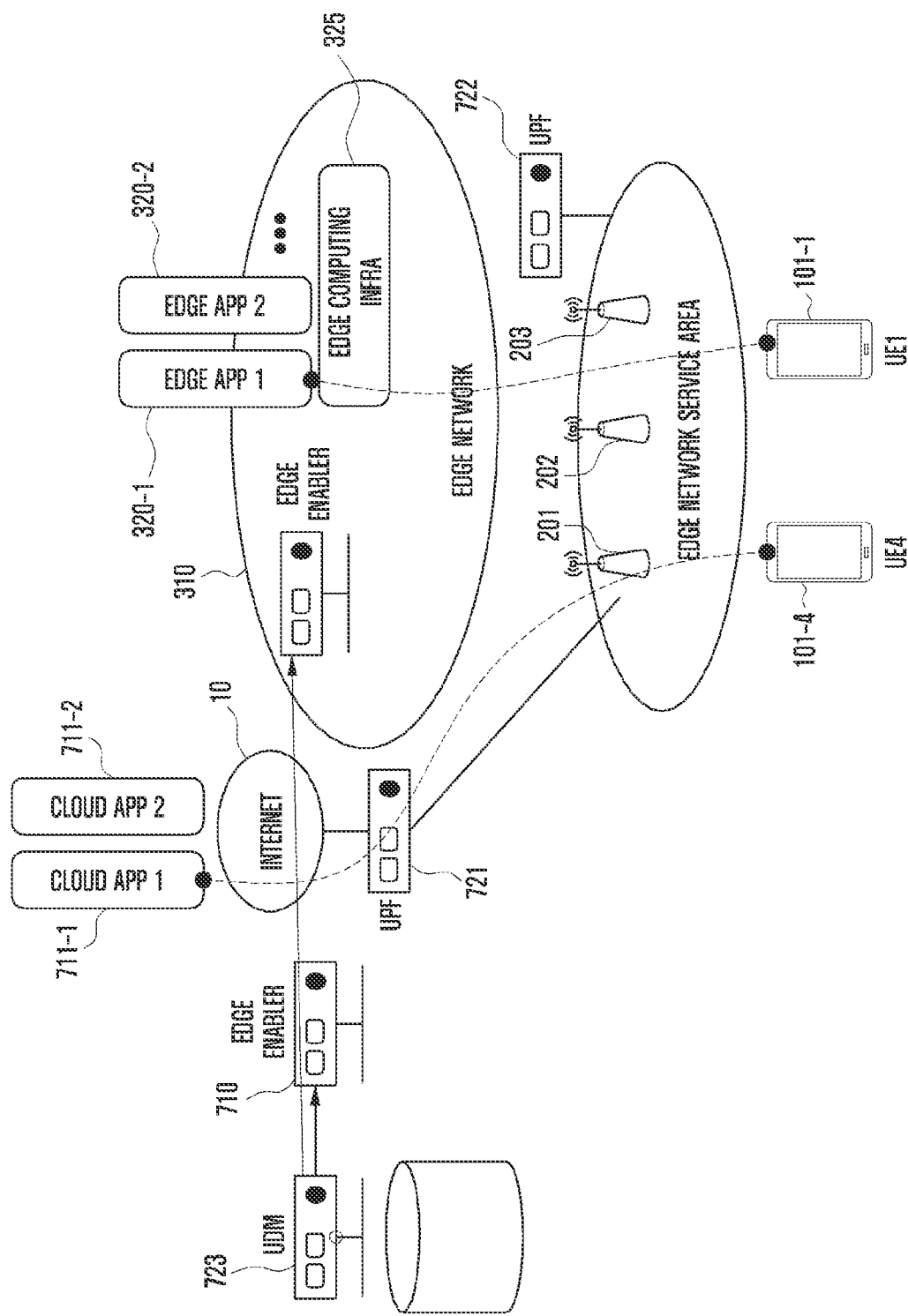
FIG. 16 illustrates a mobile network operator (MNO) model for providing an edge computing service.

FIG. 16 illustrates a mobile network operator (MNO) model for providing an edge computing service.

According to the mobile network operator model, a plurality of base stations 201, 202, and 203 is included in an edge network service area, and each base station may communicate with UEs 101-4 and 101-1. A fourth UE 101-4 may be connected to cloud application servers 711-1 and 711-2 connected to the Internet 10 through a UDM 723 and an edge enabler server 710, in which actual data may be transmitted through a UPF 721.

A first UE 101-1 may access an edge computing network by interworking with a mobile communication network or through a UFP 722 connected to an edge network located in the mobile communication network. Accordingly, the first UE 101-1 may be provided with a service from edge application servers 320-1 and 320-2 by interworking with the mobile communication network or through an edge computing infrastructure 325 of the edge network located in the mobile communication network. For this service, an edge enabler server 310 may interwork with the UDM 723.

According to the configuration of FIG. 1, subscriber-based differential services may be provided, and differentiated services may be implemented depending on whether edge computing is used and depending on each edge application or each local area.

A centralized model, a distributed model, and a hybrid model according to the disclosure are described with reference to FIG. 3.

Figure 3:
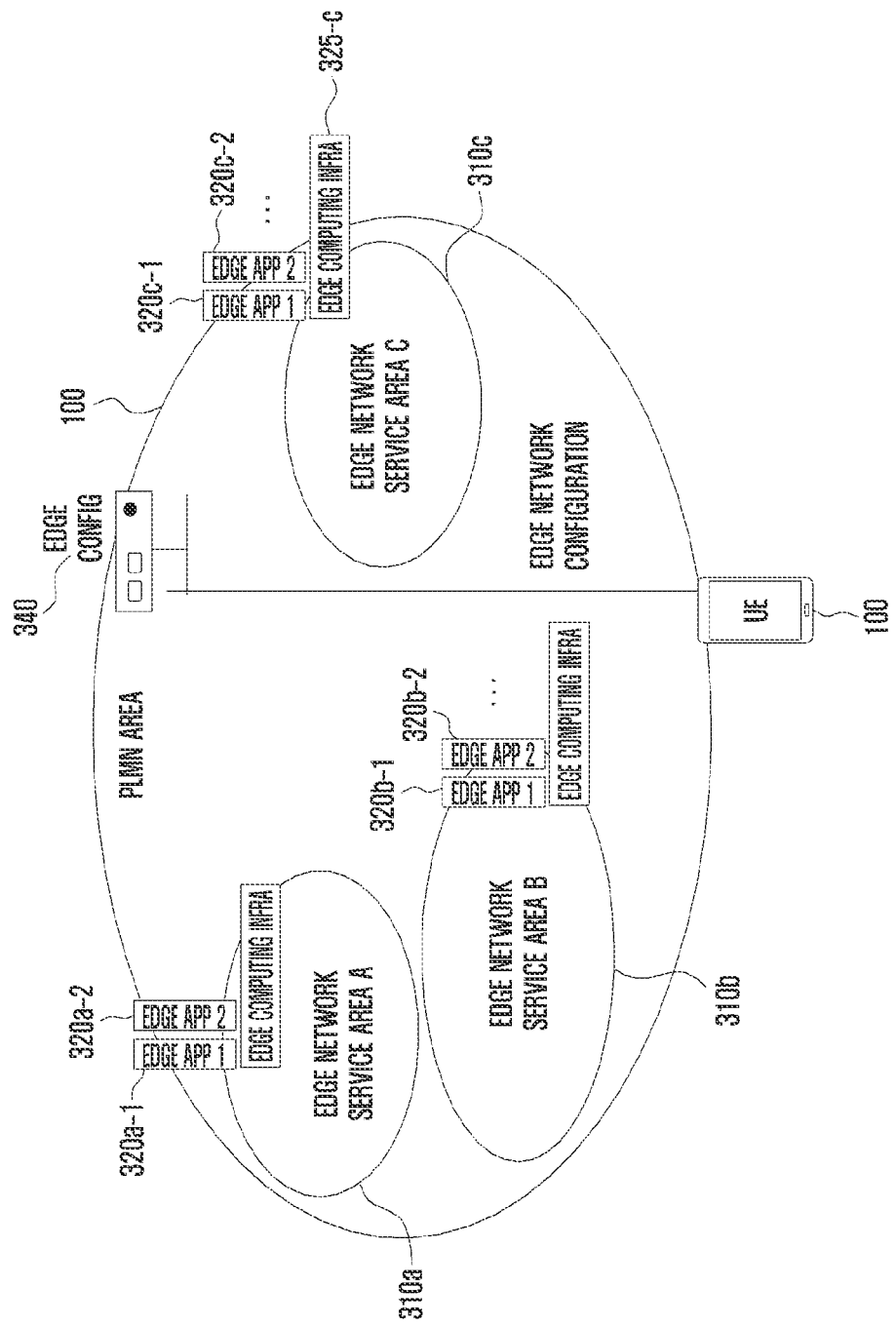
FIG. 3 illustrates a local edge data network deployment according to an embodiment of the disclosure.

In FIG. 3, an edge computing area may be defined as a subarea of a PLMN application range. The edge computing area may be a list of tracking areas of a UE 100 or a list of cells. An MNO needs to be able to identify the location of the UE in a network geographic area. The UE also needs to be able to identify the location thereof. There may be a plurality of edge computing areas in one PLMN, one PLMN may include a plurality of edge network service areas, and the individual edge network service areas may be configured not to overlap. The edge computing service areas may be deployed in a distributed manner, and two areas A and B may have adjacent boundaries as illustrated in FIG. 3.

In this case, in a centralized model, there may be only one edge computing area in the PLMN. One central entity may be configured to manage all edge applications in one PLMN. An example of this model may be an ETSI MEC architecture.

Next, in a distributed model, each edge computing area may be configured to be managed by another edge computing area management entity.

A hybrid model may be configured in a combination of the central model and the distributed model.

Next, an edge network and configuration information are described.

An edge network may use a data network or a packet data network for connection to provide an edge computing service. An edge network may be configured to be identified by a DNN or APN. An edge network may be connected via one or more RAN nodes. That is, a wireless UE may access an edge network through an RNA node. An edge network may be supported in an edge network service area. For example, as illustrated in FIG. 2, a UE 100 may be connected to an edge data network connected to a UPF through an RAN to which the UE 100 belongs. When the RAN is not connected to the edge data network, the UE 100 cannot be provided with an edge computing service.

An edge network service area may be identified as a tracking area, a cell list, an SMF service area, or a UPF service area. An edge network may include a set of network functions that support edge computing. In a 3GPP system, a UE may access an edge computing network through a data network (DN) or a packet data network (PDN) of an evolved packet core network. The connection of the UE to the data network may be provided by a 5G core network using a PDU session or by an EPC using a PDN connection.

Next, an edge network configuration is described.

An edge network configuration may be a set of configuration information needed by a UE. The edge network configuration may include information as described above with reference to FIG. 4.

Figure 17:
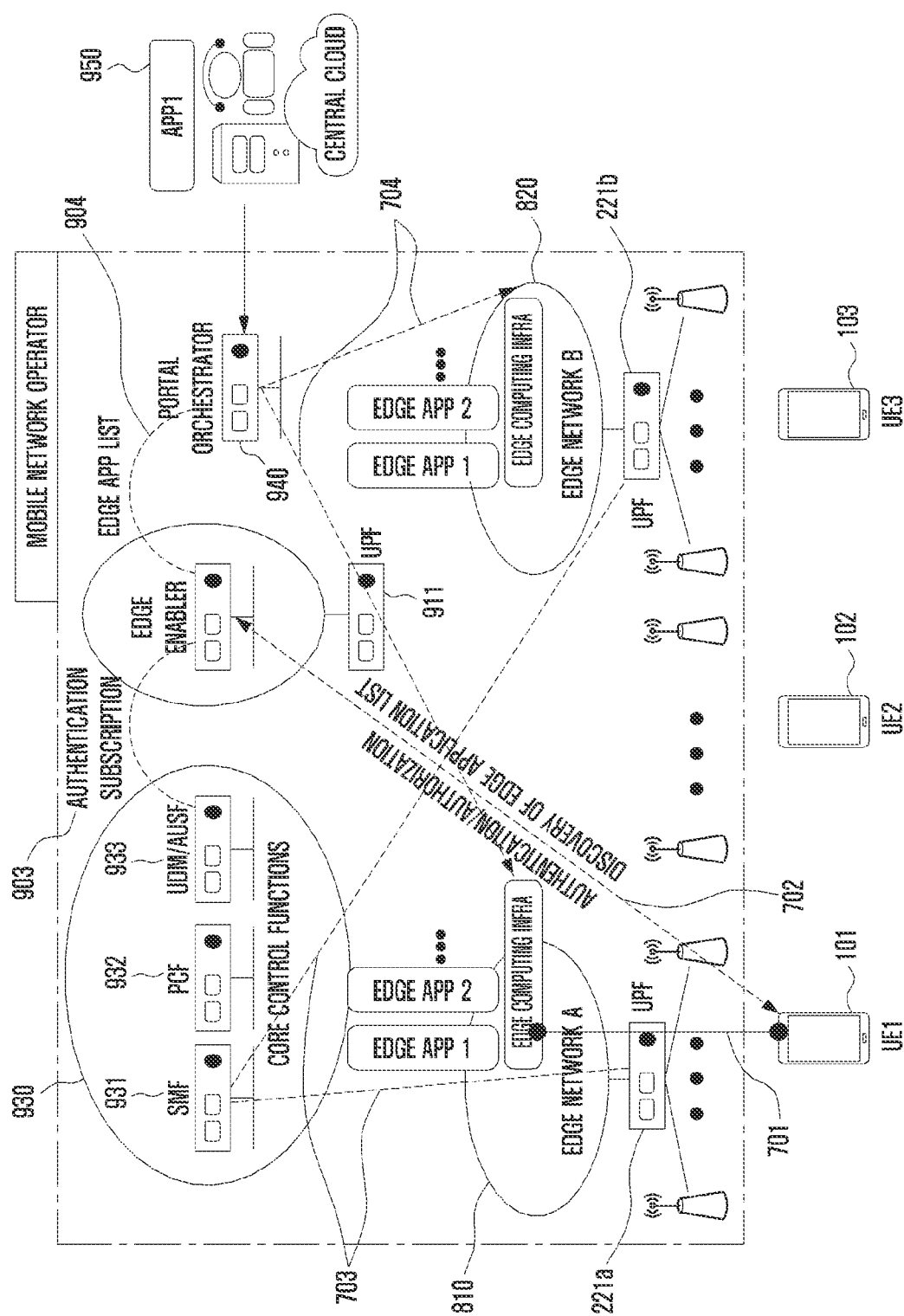
FIG. 17 illustrates an edge computing system for a centralized management MNO configuration according to the disclosure.

FIG. 17 illustrates an edge computing system for a centralized management MNO configuration according to the disclosure.

Referring to FIG. 17, a mobile network operator (MNO) may include a plurality of base stations, and each base station may be connected to UPFs 221a and 221b. The UPFs 221a and 221b illustrated in FIG. 17 may be connected to an edge network A 810 and an edge network B 820, respectively. At least one UE 101 among UEs 101, 102, and 103 may be a UE for receiving an edge computing service. As indicated by reference numeral 701, a first UE 101 may access the edge network A 810, thereby being provided with an edge data service. To this end, as indicated by reference numeral 702, an operation for authentication/authorization discovery needs to be performed through an edge enabler server 920.

FIG. 17 illustrates a case in which a core network 930 is a 5GC, and the core network may include an SMF 931, a PCF 932, and a UDM/authentication server function (AUSF) 933. A procedure for authenticating a UE may be performed between the UDM/AUSF 933 and the edge enabler server 920 (903). List information of an edge application server may be provided between a portal orchestrator 940 and the edge enabler server 920. The portal orchestrator 940 may receive the following information from the application server.

An application identifier of a UE (UE App Id), DNS Info (FQDN), an edge application, cloud resources, and geographic area information may be received.

In a method illustrated in FIG. 17, one PLMN includes a single entity (edge enabler server). Thus, all providers, such as MNOs, may use a single edge application set. Further, available edge application programs may vary depending on registration. Application program authentication may use a USIM credential or may use a separate credential. When the USIM credential is used, the USIM credential may also be used for authentication.

The 5GC core network illustrated above in FIG. 2 may have a core network component in a similar form to that described in FIG. 17. In addition, a portal orchestrator 940 may be further included. The configuration of FIG. 2 may correspond to a case including distributed enabler servers for independently operating edge computing services.

Figure 18:
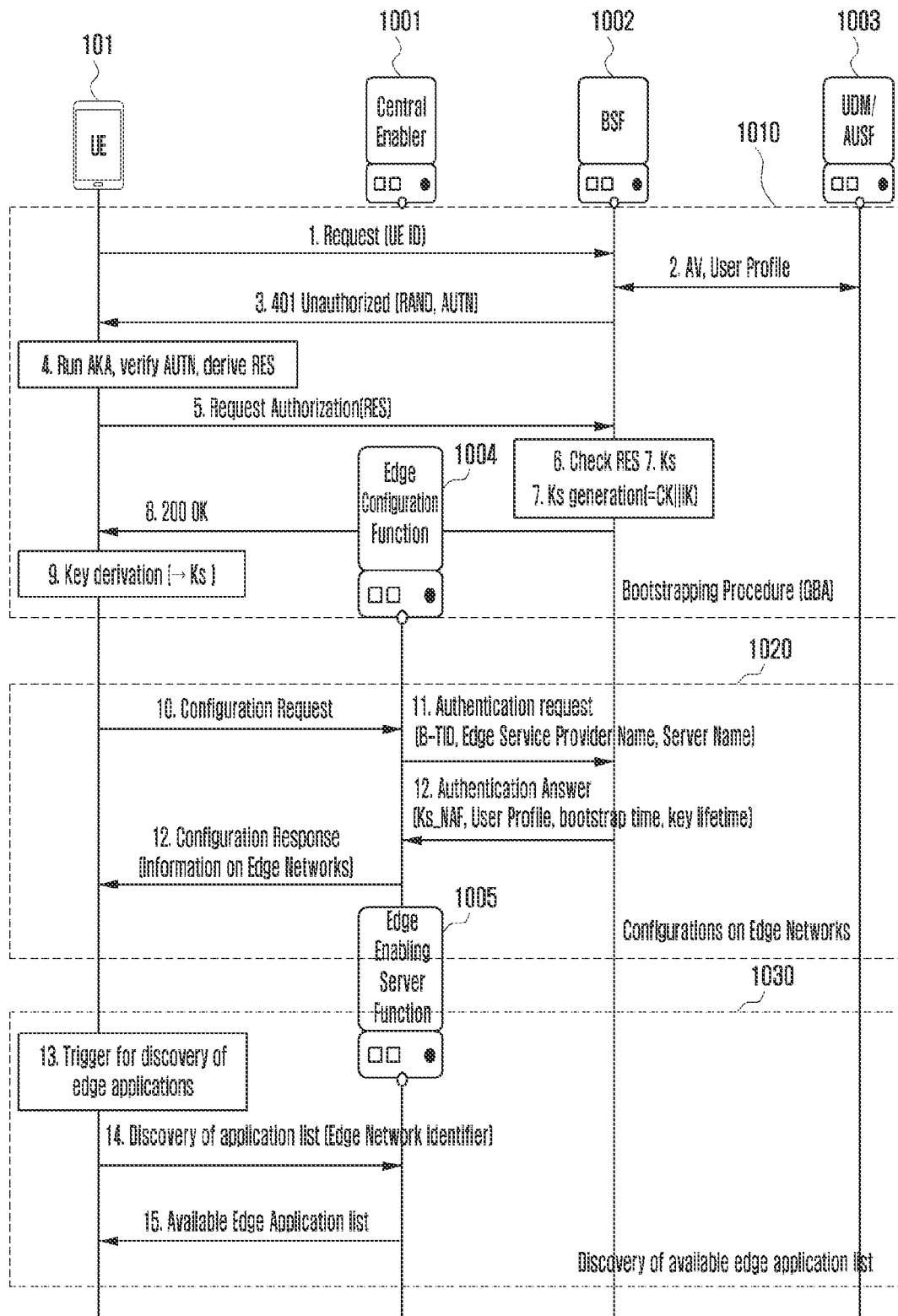
FIG. 18 is a signal flowchart according to an authentication, configuration, and discovery procedure according to a centralized management MNO configuration according to the disclosure.

FIG. 18 is a signal flowchart according to an authentication, configuration, and discovery procedure according to a centralized management MNO configuration according to the disclosure.

In FIG. 18, an operation may be performed under the following assumption. A bootstrapping server function (BSF), which is a central enabler, is a logical entity in charge of authentication using a 3GPP credential of a subscriber in an MNO and generation and management of a key to be used in an application layer. The central enabler possesses a database of all information available in a plurality of edge networks. The central enabler has a list of all available edge applications. For example, the central enabler possesses a list of edge applications in each edge network.

FIG. 18 is a signal flowchart where a UE receives a list for receiving an edge computing service according to an embodiment of the disclosure.

Specifically, in FIG. 18, the UE may perform authentication through the BSF 1002. The UE may transmit a message for requesting configuration information to a central edge enabler server 1001 from a generated key. In response to this message, the UE may receive information about EDNs locally distributed including the edge enabler server 1001. A procedure for requesting an edge application list and receiving an available edge application list when a condition for triggering an edge application discovery is satisfied through the edge enabler server 1001 is described.

In operation 1, the UE 101 transmits the identifier of the UE 101 to the BSF 1002. In operation 2, the BSF 1002 may request an authentication vector (AV) and a user profile together with a UE identifier from a UDM or AUSF 1003 and may receive the AV and the user profile for authentication. In operation 3, the BSF 1002 may return a 401 Unauthorized as a TTP response to the request of the UE 101. This message may include RAND and AUTH (information about authentication of the UE). In operation 4, the UE 101 may perform AKA authentication, may verify an AUTH, and may generate an RES.

In operation 5, the UE 101 may transmit an HTTP request for RES authentication to the BSF 1002.

In operation 6 and operation 7, the BSF 1002 verifies an RES value received from the UE 101 and generates Ks. When successfully verifying the RES, the BSF 1002 may respond to the UE 101 with 200 OK in operation 8.

In operation 9, the UE 101 may also perform AKA authentication on Ks from a 3GPP credential, thereby generating Ks.

In operation 10, the UE 101 may transmit a configuration request message for requesting the configuration of the UE 101 to a centralized EES 1004. In operation 11, the centralized EES 1004 may receive the UE identifier transmitted from the UE 101, the identifier of client software of the UE, or a bootstriping transaction ID from the UE in order to verify the configuration request message requested by the UE 101 and may transmit an authentication request message including this identifier information, an edge service provider name, a server name, and the like to the BSF 1002 that has authenticated the UE through operation 1 to operation 6. The BSF 1002 may identify the identifier of the UE 101 or the UE client stored in operation 7 or the bootstrapping transaction ID, may identify the profile received from the UDM 1003 in corresponding operation 2, and may determine whether to authorize an edge service of the UE. When the BSF 1002 determines to authorize the UE to use the edge service, the BSF 1002 may transmit a response to the authentication request to the edge configuration function (edge configuration server) 1004 in operation 12. The response message to the authentication request includes an authentication key (Ks_NAF) to be used in the edge configuration server, the profile of an authorized user, and the lifetime of the authentication key.

When the edge configuration function 1004 receives the response message, the edge configuration function 1004 may transmit configuration information including information about an edge network to the UE 101 in operation 12. The network configuration information of this message includes the edge data network configuration information illustrated in the first embodiment.

After receiving the configuration information from the edge configuration function 1004, the UE 101 may identify whether a triggering condition for discovering an edge application server occurs in operation 13, and may transmit a discovery request according to operation 14 to an EES 1005 when the triggering condition occurs. The triggering condition is as follows.

1) When a new application is installed on the UE
2) When the UE enters an area corresponding to the edge data network configuration information
3) When new traffic occurs from an application installed in the UE
4) When the UE is newly powered on Based on this message, the edge configuration function 1004 may transmit a list of available edge applications to the UE 101.

Figure 19:
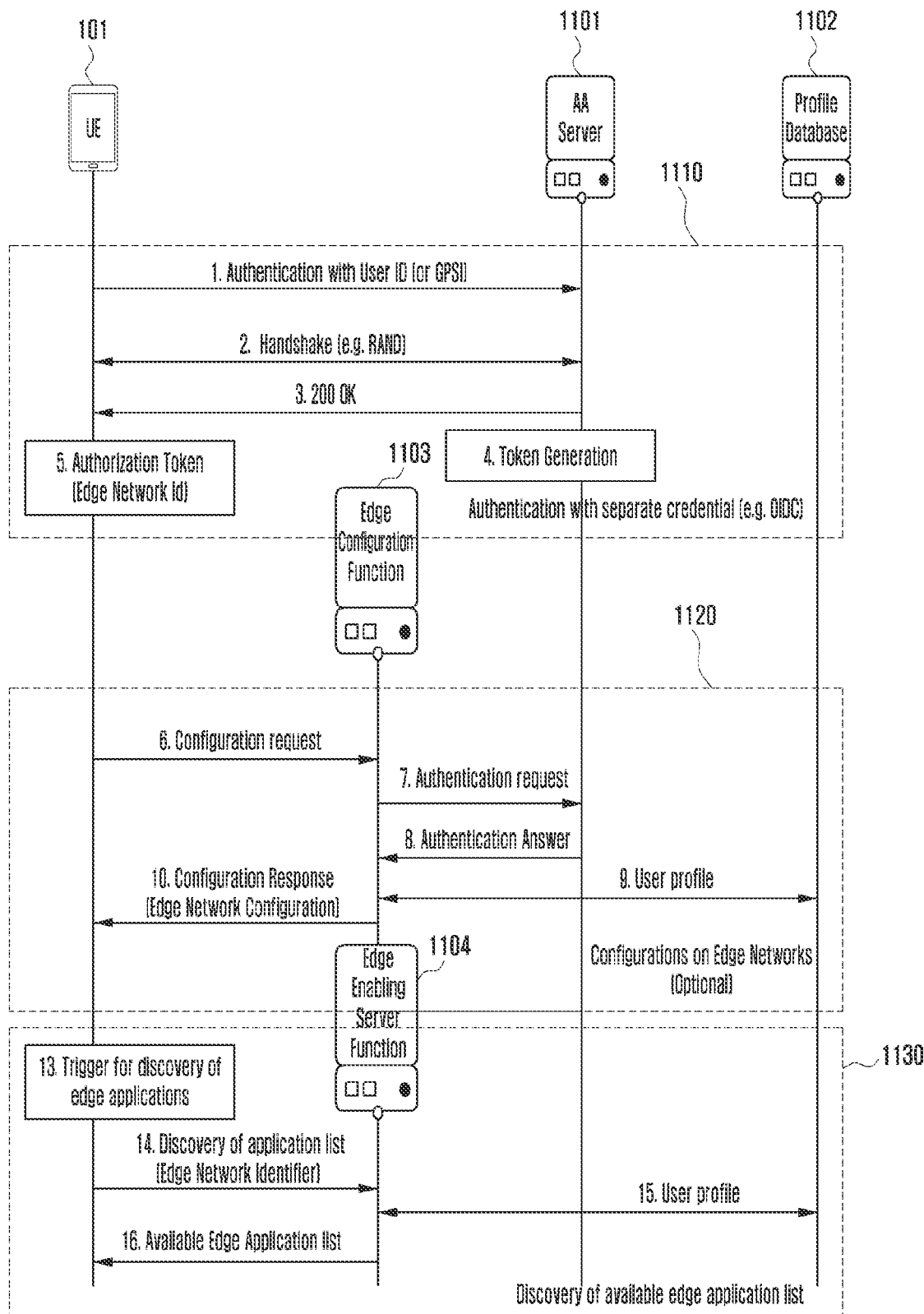
FIG. 19 is a signal flowchart according to an authentication, configuration, and discovery procedure when a distributed management MNO is configured according to the disclosure.

FIG. 19 is a signal flowchart according to an authentication, configuration, and discovery procedure when a distributed management MNO is configured according to the disclosure.

The procedure of FIG. 19 may be performed under the following assumption. One AA server may be operated by one edge computing service provider. Authentication may use a separate credential. Edge Enabler servers may be distributed or centrally located.

In operation 1110, a UE 101 performs authentication with an authentication/authorization server using a user identifier or a generic public subscription identifier (GPSI: Identifier for identifying a subscriber). After successfully performing the authentication procedure, the UE 101 and the AA server 1101 issue and share an authentication.

The UE 101 may transmit a configuration request message to an edge configuration function 1103 in operation 6. The edge configuration function 1103 may transmit an authentication request to the AA server 1101 in operation 7. The AA server 1101 may identify the authentication request, may perform authentication of the UE, and may transmit a result to the AA server 1101 in operation 8.

The edge configuration function 1103 may request and receive a user profile from a profile database (or UDM) 1102 in operation 9. The edge configuration function 1103 may transmit edge data network configuration information to the UE 101 in operation 10.

The UE 101 may transmit a discovery request to an edge enabler server 1104 in operation 14. The edge enabler server 1104 may request and receive the user profile from the profile database 1102 in operation 15. According to the user profile, the edge enabler server 1104 may transmit a list of available edge applications to the UE 101 in operation 16.

The foregoing details are provided for the convenience of understanding of the disclosure, and the disclosure is not limited thereto.

INDUSTRIAL APPLICABILITY

The disclosure may be used for providing an edge computing service in a wireless communication system.

The invention claimed is:

1. A method for obtaining edge data network configuration information by a user equipment (UE) to receive an edge computing service in a wireless communication system, the method comprising:
   Transmitting, to an edge data network configuration server, an initial provisioning request message; and
   Receiving, from the edge data network configuration server, an initial provisioning response message comprising information about an edge data network,
   wherein a uniform resource identifier (URI) assresses of the edge data network configuration server is used for the transmission of the initial provisioning request message.

2. The method of claim 1, wherein the URI address is configured as http://edgeconfiguration.<domain>/provisioning.

3. The method of claim 1, wherein the edge computing service is provided through an edge data network comprising one data network or a packet data network for providing the edge computing service.

4. The method of claim 1, wherein the initial provisioning response message includes, as information for establishing an edge data network session, at least one of a data network name (DNN), an access point name (APN), and single network slice assistant information (S-NSSAI).

5. The method of claim 1, wherein the initial provisioning response message includes, as edge data network service area configuration information, at least one of a tracking area, a cell ID list, and a PLMN ID.

6. The method of claim 1, wherein the initial provisioning response message includes, as edge data network application layer access information and authentication information, at least one of an edge computing enabling server address (URI) and an ID of a service provider that operates an edge data network.

7. A user device for obtaining edge data network configuration information to receive an edge computing service in a wireless communication system, the user device comprising:
- an application client configured to be provided with an edge computing service and to provide the edge computing service to a user;
- an edge enabler client configured to perform control for accessing an edge computing server to provide the edge computing service; and
- a mobile terminal configured to perform a modem operation for accessing the wireless communication system,
- wherein the edge enabler client
- controls the mobile terminal to transmit an initial provisioning request message to an edge data network configuration server, and
- controls the mobile terminal to receive an initial provisioning response message comprising information about an edge data network from the edge data network configuration server, and
- wherein a uniform resource identifier (URI) assresses of the edge data network configuration server is used for the transmission of the initial provisioning request message.

8. The user device of claim 7, wherein the URI address is configured as http://edgeconfiguration.<domain>/provisioning.

9. The user device of claim 7, wherein the edge computing service is provided through an edge data network comprising one data network or a packet data network for providing the edge computing service.

10. The user device of claim 7, wherein the initial provisioning response message includes, as information for establishing an edge data network session, at least one of a data network name (DNN), an access point name (APN), and single network slice assistant information (S-NSSAI).

11. The user device of claim 7, wherein the initial provisioning response message includes, as edge data network service area configuration information, at least one of a tracking area, a cell ID list, and a PLMN ID.

12. The user device of claim 7, wherein the initial provisioning response message includes, as edge data network application layer access information and authentication information, at least one of an edge computing enabling server address (URI) and an ID of a service provider that operates an edge data network.

13. A method for providing edge data network configuration information by edge data network configuration server to a user equipment (LIE) through a wireless communication system, the method comprising:
- receiving, from the UE, an initial provisioning request message; and
- receiving an initial provisioning response message comprising information about an edge data network,
- wherein a uniform resource identifier (URI) address of the edge data network configuration server is used for the transmission of the initial provisioning request message.

14. The method of claim 13, wherein the initial provisioning response message includes, as information for establishing an edge data network session, at least one of a data network name (DNN), an access point name (APN), and single network slice assistant information (S-NSSAI).

15. The method of claim 13, wherein the initial provisioning response message includes, as edge data network service area configuration information, at least one of a tracking area, a cell ID list, and a PLMN ID, and
includes, as edge data network application layer access information and authentication information, at least one of an edge computing enabling server address (URI) and an ID of a service provider that operates an edge data network.

* * * * *